Figure 3:
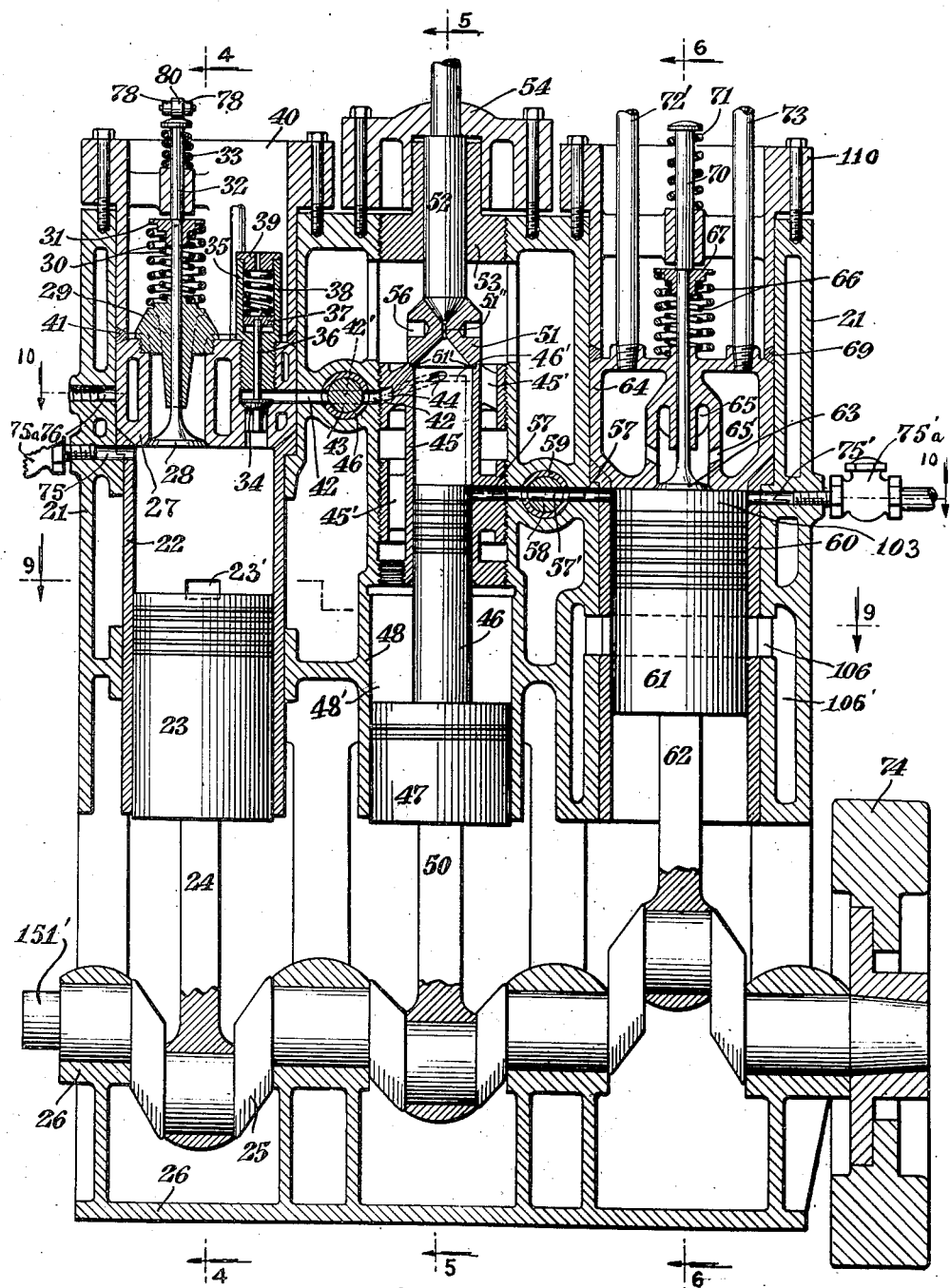

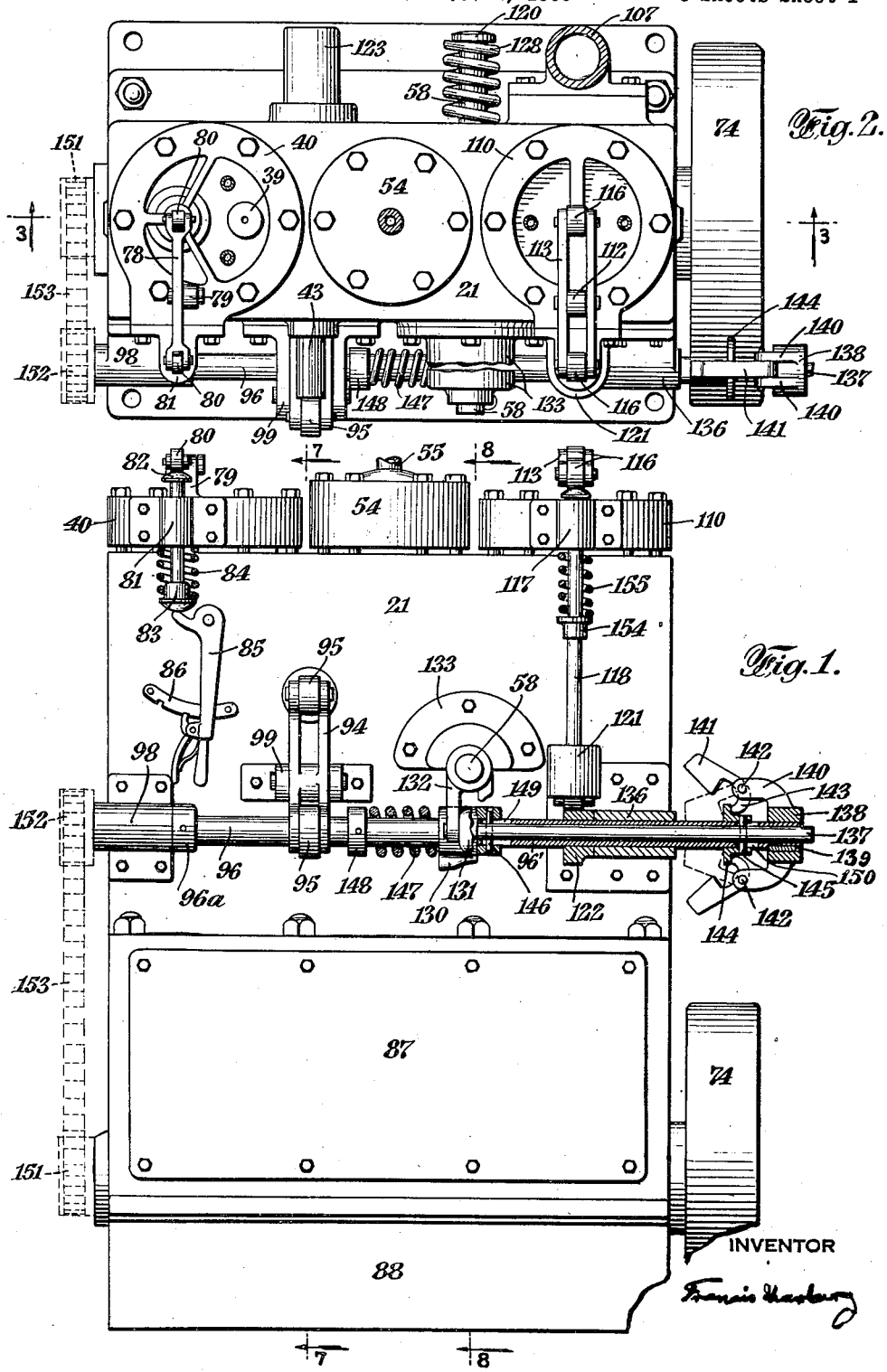

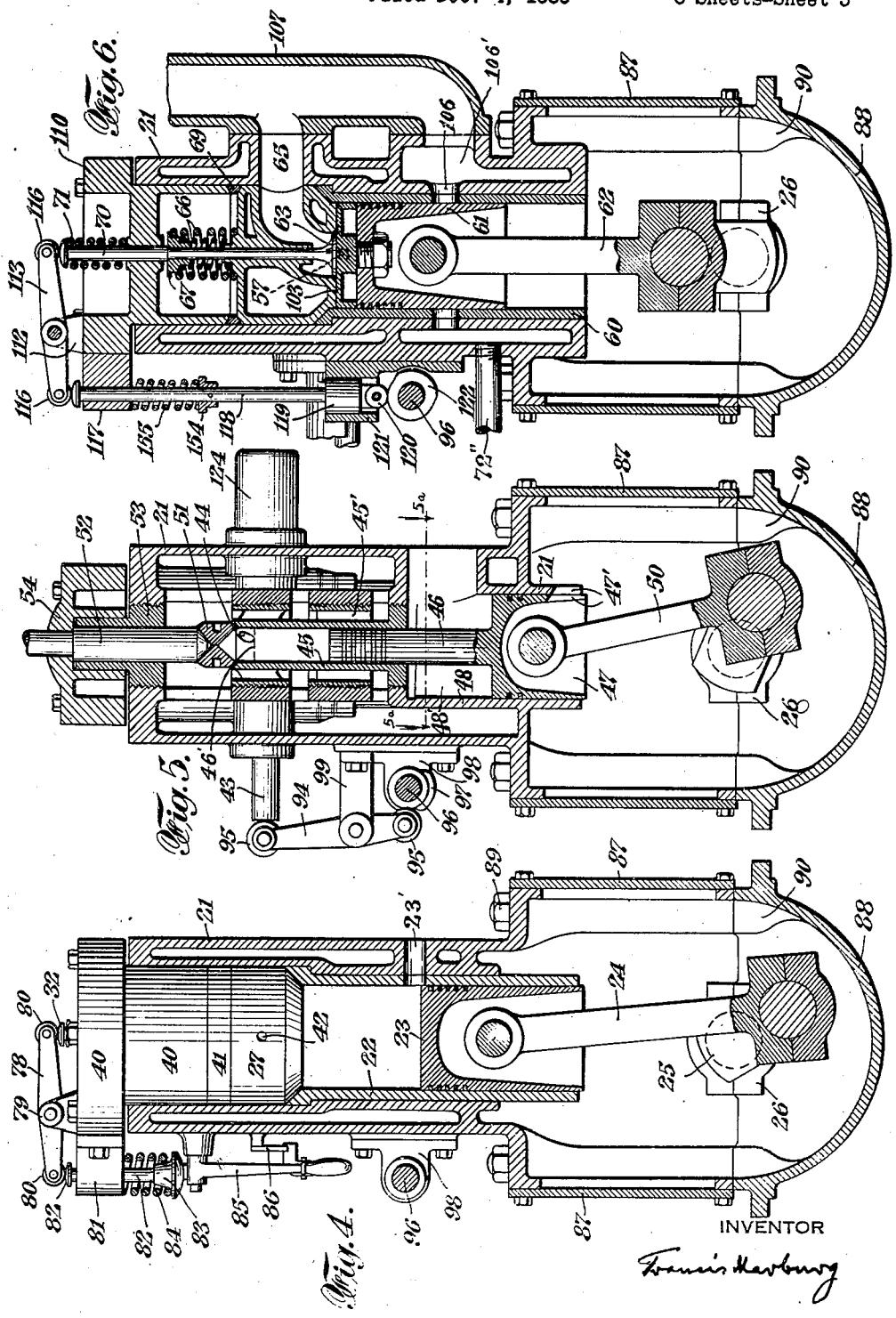

Feb. 2, 1943. F. MARBURG 2,309,968
TWO-CYCLE, SUPERCHARGED, COMPOUND, DIESEL ENGINES
Filed Dec. 4, 1939 6 Sheets-Sheet 4
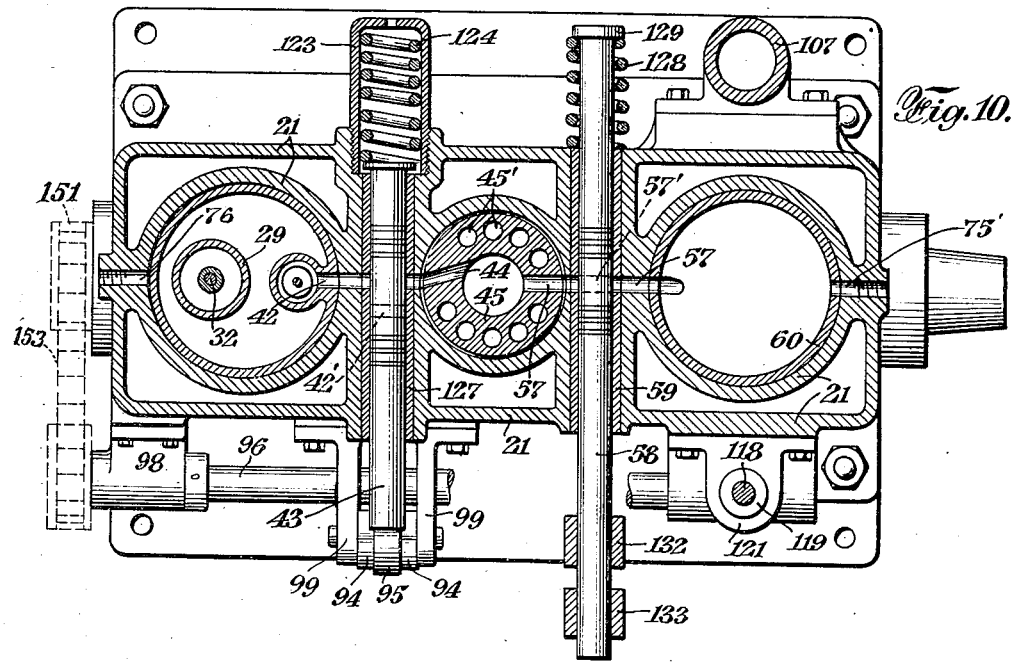
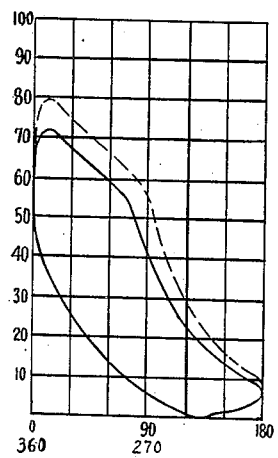
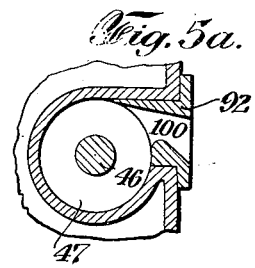
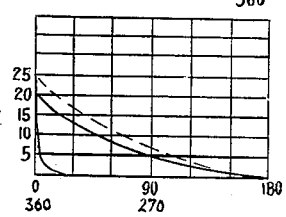
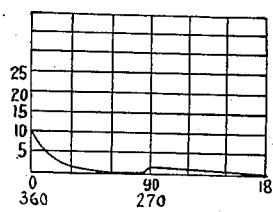
INVENTOR
Francis Marburg

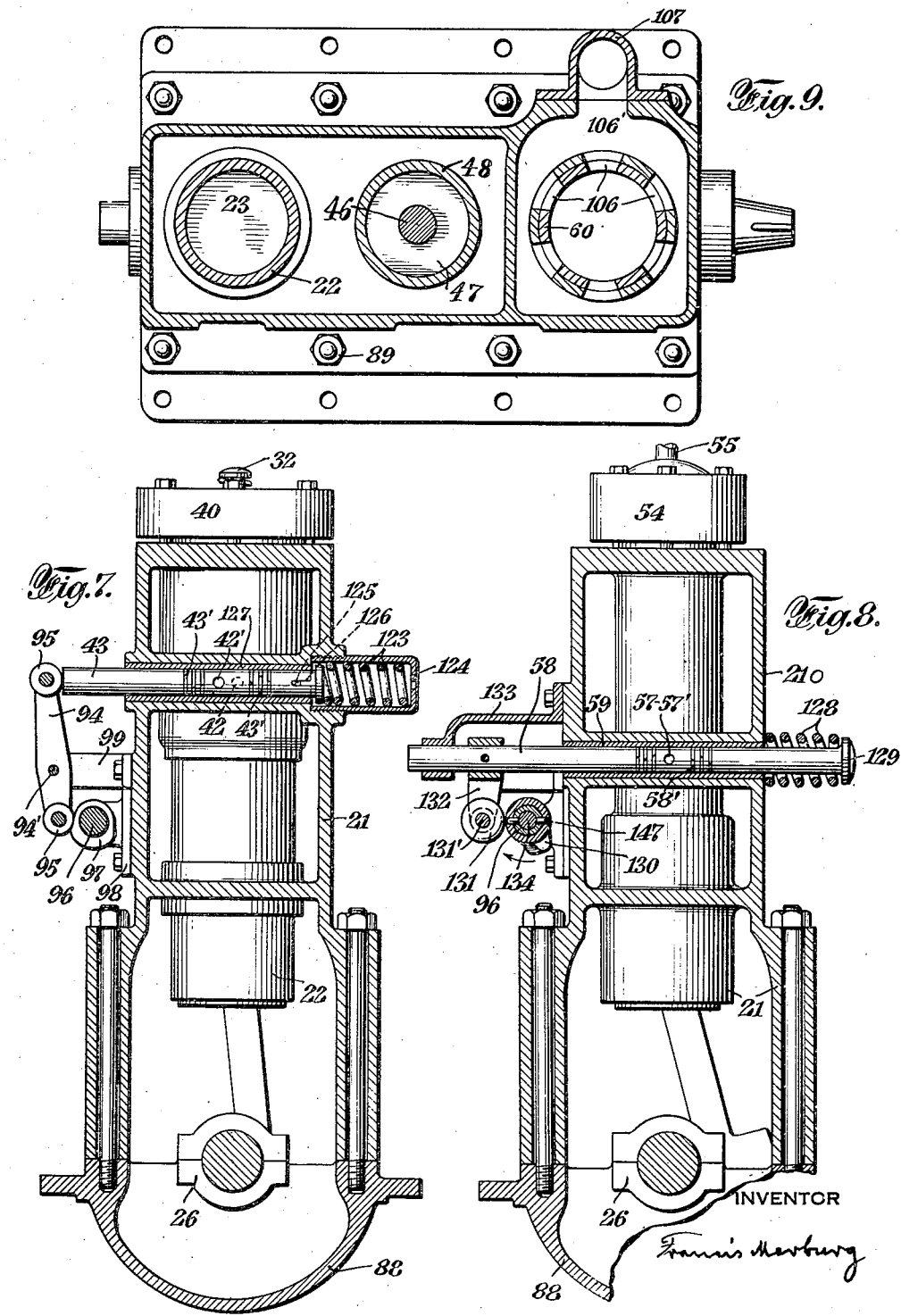

Feb. 2, 1943. F. MARBURG 2,309,968
TWO-CYCLE, SUPERCHARGED, COMPOUND, DIESEL ENGINES
Filed Dec. 4, 1939 6 Sheets-Sheet 6

INVENTOR
Francis Marburg

Patented Feb. 2, 1943

2,309,968

UNITED STATES PATENT OFFICE 2,309,968

TWO-CYCLE, SUPERCHARGED, COMPOUND, DIESEL ENGINE

Francis Marburg, Odessa, Fla.

Application December 4, 1939, Serial No. 307,495

23 Claims. (Cl. 60—15)

My invention broadly refers to 2 cycle, supercharged, Diesel engines. More specifically it relates to improvements in 2 cycle, supercharged, compound, Diesel engines, containing a cylinder air compressor unit for supercharging a cylinder high pressure power unit, into which latter fuel is injected during beginning of the power stroke and wherein combustion and part-expansion take place, whereupon gases overflow into a cylinder low pressure power unit, expanding further simultaneously within both power units, generating additional power.

Applicant believes, inventors heretofore made a mistake, by attempting to combine the low pressure power unit and the air compressor unit into a single unit, because this prevented proper timing of scavenging, of internal air-cooling, of supercharging and of compression and because this heretofore necessitated long air-overflow ports and large dead air spaces between the air compressor and the high pressure power unit, which must be avoided. The proper solution of compounding is of such great importance, as will be proven hereinafter, that complication caused by employing a separate cylinder air compressor are relatively unimportant in connection with a greatly supercharged Diesel engine, wherein greatest reliability and highest efficiency are the essential features.

There are difficulties not recognized or mentioned heretofore, which are the real causes of non-success of compounding until the present time. Applicant will set forth and explain these difficulties and will offer his original solutions of the major problems of compounding a 2 cycle Diesel engine.

In commercial supercharged engines, more or less supercharging has been used, improving fuel efficiency and M. I. P. In such engines, the gas—and air—overflow of the high-pressure power unit is utilized in operating a turbo-blower, or the like, supercharging the high pressure power unit.

The fundamental causes, improving combustion and efficiency of supercharged Diesel engines, evidently are not generally understood. The writer's experience and observations, during tests at various compressions, with many types and sizes of Diesel engines, as well as all facts proven by known research work, clearly point towards much higher compression than used heretofore, in combination with relatively late fuel injection, with great supercharging and compounding, as fully set forth hereinafter. A properly constructed, compound Diesel engine will act very similar to a compound, or triple expansion, non-condensing, high pressure, superheated, steam engine, with variable steam cut-off, as will be explained more fully hereinafter.

Speaking broadly of present Diesel engine development, high M. I. P. and relatively low fuel consumption, are obtained at the sacrifice of smooth operation, causing considerable wear and tear in expensive high speed Diesel engines. The industry requires a smooth running, high speed engine, operating with lowest possible fuel consumption, capable of burning most any fuel which can be pumped and vaporized successfully. Theoretically, such an engine can be produced by employing very high compression, because compression has been proven to be the most potent factor reducing lag of ignition and explosion. In practice, important reasons prevent the use of much higher compression than used at present, as will now be explained.

With flat piston top and flat cylinder head, the compression chamber becomes more and more pancake-shaped with increased compression, making it impossible to distribute fuel uniformly within the combustion chamber. Furthermore, with increased compression, very hot air and gases get into still closer contact with relatively very cool, large surfaces. In order to produce very quick, perfect mixture and combustion within such a combustion chamber, a large excess of air must be compressed, producing lower M. I. P., lower thermodynamic efficiency and a relatively large engine per B. H. P. A more pancake shaped compression- and combustion chamber, than heretofore, would increase heat-absorption and heat-conduction losses, which, in present engines, are already almost equal to the thermodynamic equivalent of the total B. H. P. For the above mentioned salient reasons, it has been found impractical to increase compression within such engines to more than 16 to 1, with compression temperatures of about 1000 degrees F.

While trying to improve fuel- and air-mixture, inventors designed innumerable shapes of compression and combustion chambers, containing more or less compact air pockets, into which fuel is sprayed. During maximum compression, air is momentarily concentrated to a greater extent within these pockets, arranged within the cylinder head, or piston, or within both cylinder head and piston. The difficulty with all such compression spaces or chambers, is, that during piston- and crank-positions, between 20 degrees before and 60 degrees after dead center, that is during fuel injection and combustion, such compression spaces are subjected to enormous sudden changes or distortions, making it impossible to distribute fuel evenly throughout such alterable spaces or chambers. Momentary, strong turbulence is produced within such alterable spaces, but such turbulence is not methodical and dies out very quickly in connection with very highly compressed air and dense gases. Very quick fuel injection does not overcome these difficulties materially, on the contrary, it produces stronger explosions. Only a portion of the air is concentrated within compact air pockets, a portion of the relatively large and cool wall surfaces is in even closer contact with very hot compressed air and gases, than within pancake-shaped chambers. Heat absorption and heat conduction losses to the outer cooled wall surfaces, in such chambers, are substantially the same as within pancake shaped chambers.

In order to overcome the above said difficulties, other inventors proposed great supercharging and compounding, which were steps in the right direction, but inventors failed to provide proper internal air-cooling of high pressure power unit surfaces which are most exposed to intense heat. The life of such an engine could therefore be very short, at best.

With great supercharging and very high compression, say of 65 atm. more or less, such as recommended by applicant, fuel injection may be delayed until about maximum compression has been reached. In such an engine, explosion can substantially be avoided, while in engines with 40 atm. maximum compression, with fuel injection starting 20 degrees, more or less, ahead of outer dead center crank and piston position, compression is insufficient to prevent considerable lag of ignition and accumulation of fuel, which causes explosion during each crankshaft revolution. With 200 per cent, more or less, supercharging, at normal load, that is with many times, the amount of oxygen or pure compressed air, within applicant's compression chamber, that is ordinarily used within power cylinders of the same diameter, applicant does not produce a pancake-shaped compression or combustion-chamber, even with compression of about 1 to 25 instead of 1 to 16. For reasons fully set forth and explained hereinafter, expansion in applicant's compound engine may be 50 to 1, as compared with 16 to 1 in non-compound engines. Exhaust losses and heat-absorption and heat-conduction losses, in applicant's compound engine, as a result of vast gas expansion and of the very compact combustion chamber, are reduced to a fraction of corresponding losses in ordinary engines, as will be more fully set forth and explained hereinafter. Powerful air- and gas-twirl is produced and easily maintained within applicant's compact, cylindrical, compression and combustion chamber, greatly assisting in breaking up, distributing and gasifying fuel and in mixing fuel gases with air, producing almost instant ignition and combustion, with little air required over and above the theoretically necessary amount of air, at normal load.

Applicant realized, that very high compression, great supercharging and compounding, are inseparably connected with and supplementing each other, producing instant perfect combustion. Only by combining these features, does it become possible to successfully compound a 2 cycle Diesel engine. Because of resulting extreme concentration of heat units and extremely intense heat-radiation, within the greatly supercharged, compact combustion space, during a large portion of each crankshaft revolution, extremely efficient internal air-cooling becomes the crucial factor in compounding.

Known constructions of 2 cycle, greatly supercharged, compound, Diesel engines, do not show sufficient means, internally air-cooling, especially the axially outer portions of the high pressure power cylinder and the cylinder head. It is one of the main objects of applicant's invention to overcome and remedy this defect.

Other novel features will be set forth and explained hereinafter.

Figure 14:
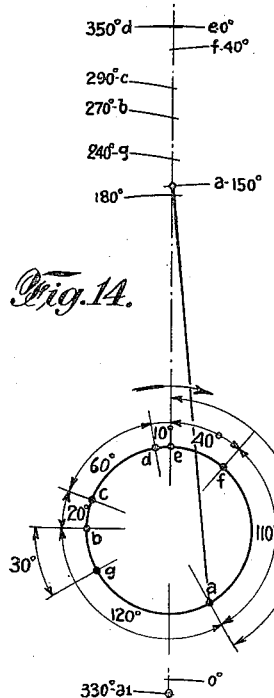
Figure 15:
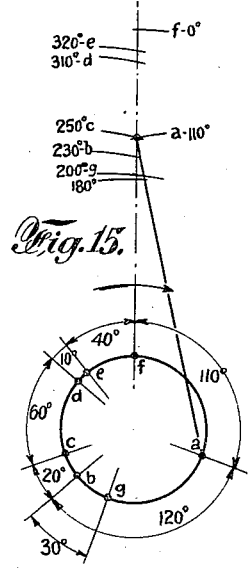
Figure 16:
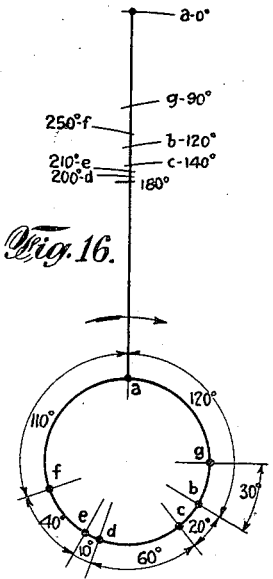
Figure 17:
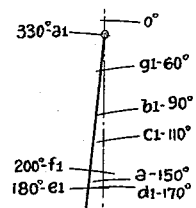
Figure 18:
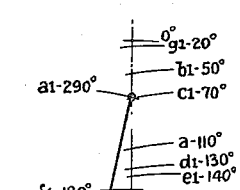
Figure 19:
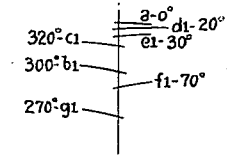

Referring now to the attached drawings, illustrating embodiments of my invention, the same numbers refer to same parts. Figure 1 is a side view of the engine. Fig. 2 is a top view and Fig. 3 is a vertical, longitudinal section, on line 3—3 of Fig. 2. At the left end of each of these illustrations is a cylinder air compressor unit, in the center is a cylinder high pressure power unit and at the right end is a cylinder low pressure power unit. Fig. 4 is a vertical cross-section through the air compressor unit on line 4—4 of Fig. 3. Fig. 5 represents a vertical cross-section through the high pressure power unit on line 5—5 of Fig. 3. Fig. 5a is a horizontal cross-section on line 5a—5a of Fig. 5. Fig. 6 represents a vertical cross-section through the low pressure power unit on line 6—6 of Fig. 3. Figs. 7 and 8, respectively, are vertical cross-sections on lines 7—7 and 8—8 of Fig. 1. Figs. 9 and 10, respectively, are horizontal cross-sections on lines 9—9 and 10—10 of Fig. 3. Figs. 11, 12 and 13 represent assumed indicator diagrams, explained hereinafter. Figs. 14, 15 and 16, respectively, illustrate diagrammatically simultaneous relative crank and piston positions of the air compressor unit (Fig. 14), of the high pressure power unit, (Fig. 15) and of the low pressure power unit (Fig. 16). Figs. 17, 18 and 19, respectively, illustrate simultaneous relative crank and piston positions of a second complete set or group of units (not shown in drawings), the latter group being offset 180 degrees from the first, illustrated group of units, as will be explained more fully hereinafter.

Referring now specifically to Figs. 1 and 2, a general arrangement is shown, of a 2 cycle, supercharged, compound, Diesel engine, wherein 21 is the main engine casing, 88 is the crankcase, 87 is a crankcase cover and 74 is a fly wheel. By means of sprocket wheels 151 and 152 and chain 153, the crankshaft is driving a camshaft 96, revolving in bearings 98 and 136. Clamping-down sleeves 40, 54 and 110 are shown. A cam-operated cylindrical valve 43 (Fig. 2) controls an air-overflow port, provided between the air compressor unit and the high pressure power unit and a cam-operated cylindrical valve 58 (Fig. 1) controls a gas and air-overflow port, provided between the high-pressure power unit and the low pressure power unit. The purpose of cam 122 (Fig. 1) is to operate an exhaust valve for the low pressure power unit, shown and explained in a sectional drawing hereinafter. At the right end of the camshaft, an automatic centrifugal device, of known construction, is illustrated. Flyweights 141 are suspended on pins 142, secured within arms 140, cast to a collar 138, secured to the camshaft by key 139. As a result of centrifugal force of the weights, the fingers 143 press against collar 144, slidably arranged on the camshaft. As illustrated, a push rod 137 extends through a hollow portion of the camshaft. Collar 144 is secured to the push rod by key 145, the latter being driven by the camshaft and arranged axially slidable within slot 150 within the camshaft. Referring to the shiftable cam 130, a key 146 passes slidably through slot 149 within the camshaft, connecting push rod 137 with cam 130. At the left side of the cam is a spring 147, resting against collar 148 secured to the camshaft, the spring pushing at its right end against the shiftable cam 130. As illustrated, the fly-weights 141, the push rod 137 and the shiftable cam 130 are shown in running position, during normal speed and load. During start of the engine and at low speed, the spring 147 pushes the shiftable cam 130 and the push rod towards the right, pushing the fly-weights 141 inwardly, as shown in dotted lines. The manner in which the gas and air overflow valve 58 is operated and its action and purpose will be shown and explained more fully hereinafter, in connection with cross-sectional drawings. It suffices at present, to say, that at engine start and at high load, that is at relatively low speed, the gas and air-overflow valve closes the port earlier than at low load and at relatively high speed.

Referring now to Fig. 3, the air compressor cylinder 22 is secured within the main casing 21. The piston 23 is driven by connecting rod 24, cranks 25 and crankshaft 151', revolving within bearings 26. The liquid-cooled cylinder head 27, comprises an air-inlet valve 28 and an air overflow check valve 34. The stem of valve 28 is guided within bearing 29, secured to the cylinder head, the arrangement serving as air inlet for the air compressor in the usual manner, as indicated by dotted lines. The push rod 32 is arranged slidably within a bearing cast to the sleeve 40, being pressed upwardly by spring 33 against roller 80 supported revolvably in lever 78, as shown and explained more fully hereinafter. The air inlet valve, as usual, is closed by spring or springs 30, resting on bearing 29 and pressing against top 31 secured to the valve stem. During normal operation, the push rod does not touch the top of the valve stem, its purpose, as illustrated and explained more fully hereinafter, being only, to keep the valve open during a few crankshaft revolutions, if and while the engine is started by electric motor or the like, until the flywheel can assist in compressing air and starting the motor in known manner. The sleeve 40 is forced down on a soft-metal packing ring 41, which latter is ground to the top of the cylinder head 27, whereupon the ring is cut into three sections, pressed air-tight on the top of the cylinder head 27, the latter being ground and pressed air-tight on the cylinder at 27'. Referring to the air-overflow check-valve 34, the latter is of usual construction comprising a push rod 36, a washer 37, a spring 38 resting against a block 39, secured within casing 35, secured to the cylinder head, keeping the valve 34 closed until the air-pressure within the air compressor lifts the valve. Two more constructional features should be mentioned, namely the starting air-inlet port 75 and the piston controlled starting air-outlet port 23'. The engine can be started either by electric or other motive power or by starting air, as will be shown and explained more fully hereinafter.

In the specification and claims, the expressions "axially outer" and "axially inner" and "outer" or "inner" occur frequently. "Axially" refers to the axis of the respective cylinder, either of the air compressor or of the power units, as the case may be. The expressions "outer" and "inner" unless differently specified, respectively, mean further outwardly from the crankshaft or further inwardly towards the crankshaft.

Referring now to the high pressure power unit, 45 is the high pressure power cylinder, secured within the main engine casing. The piston, as illustrated, is of the step-piston type, the axially outer power piston end 46 of small diameter is operating within the power cylinder, while the axially inner step-piston end 47, of larger diameter, is serving as cylindrical crosshead and is guided snugly within an air cylinder or cylindrical slide 48, arrangde axially inwardly from and co-axially with the power cylinder. The piston drives the crankshaft in the usual manner by means of a connecting rod 50. The step-piston takes up the side-thrust caused by the connecting rod, providing very large and relatively very cool piston-pin and step-piston sliding surfaces, within the cylindrical slide, which is important, considering the very high M. I. P. and very high mean gas temperatures, within the high pressure power cylinder, during the power stroke. Complete absence of side thrust at the axially outer high pressure power piston end becomes an essential feature of applicant's high pressure power unit. 51 is the high pressure power unit cylinder head, preferably made of forged steel, completely surrounded by cooling liquid. The fuel cylindrical spray valve casing, or the like, 52, is at its inner end surrounded by cooling liquid, and as shown, is guided co-axially with the cylinder head and cylinder, within the internally cylindrical sleeve 53, which latter, as illustrated, is screwed into the main engine casing, the sleeve being also arranged co-axially with the cylinder head and cylinder. The spray valve casing, or the like, is ground to the cylinder head and is forced tight on the cylinder head, by pressure exerted by the clamping down sleeve 54. The cylinder head is gripped solely between the spray valve casing and the cylinder and therefore is simultaneously pressed tight on the cylinder, by the pressure exerted by the clamping down sleeve 54. The arrangement permits of perfectly uniform external liquid cooling of the cylinder head, preventing pre-gasifying of fuel, before entering into the combustion chamber. A soft copper ring 51' may be placed between the cylinder head and the cylinder. The well cooled cylinder head and the manner of its being forced down by a spray valve casing, or the like, is novel and important, because it prevents pre-gasifying of fuel and prevents the copper ring 51' from becoming too hot and blowing out, even at extremely high mean gas temperatures prevailing within the high pressure combustion chamber.

The construction of the fuel pump and spray valve is not shown or indicated, because this has nothing to do with the invention. Any convenient efficient known fuel spray valve or system of fuel injection may be employed. As indicated, fuel enters into the combustion chamber through a small opening 51'' provided at the axis of the cylinder head, fuel being spread uniformly throughout the chamber.

Assuming the power piston is on its inward power stroke, the check valve 34 and the cylindrical air-overflow valve 43, within the air-overflow port 42, are closed, as shown, cutting off communication between the air compressor and the high pressure power unit. The opening and closing mechanism for the cylindrical air-overflow valve 43, which latter is placed in series between the check valve 34 and the high pressure power unit, and its purpose, will be shown and explained more fully hereinafter. As indicated, partly by dotted line, the extension 44 of the air-overflow port 42, terminates tangentially and axially outwardly into the high pressure power cylinder, preferably at least partly above the dotted line 46', representing outer dead center power piston position. The purpose of this original construction, is, to produce perfect scavenging and particularly very efficient internal air-cooling of wall portions most exposed to extremely hot gases, during a relatively large crank-angle period during each revolution. The construction furthermore permits of simultaneous, joint, high air compression within the air compressor unit and within the high pressure power unit. Powerful twirl within the high pressure power unit is increased up to completion of supercharging, thus producing efficient heat-convection and internal air-cooling of the above said wall portions, during scavenging and during beginning of the supercharging and air-compression period.

From an indicator diagram of the high pressure power unit (Fig. 11), based on general experience, it is clear, that unless the air-overflow port terminates into the high pressure power unit closely to outer dead center power piston position, marked 46', preferably partly above this dotted line, air pressure within the air-overflow port, while being closed by the piston during compression, could only be a fraction of the gas- and air-pressure within the high pressure power unit at the moment of the reopening of the port by the piston during the power stroke. This would result in momentary overflow of a small quantity of gases at great momentary overpressure and at temperature of about 2500 degrees F., during each crankshaft revolution, burning the piston and port edges, which is entirely avoided with applicant's design.

Referring now to the gas and air-overflow port 57, provided between the high pressure and low pressure power units, this latter port is controlled by the high pressure power piston in known manner. The piston is just beginning to open the port on its inward power stroke. The cylindrical valve 58, as shown, has already been fully opened, permitting quick gas and air-overflow. During scavenging, the air-overflow port, mentioned hereinbefore, and the gas and air-overflow port and the valves arranged therein, are more or less air-cooled. During supercharging, the cylindrical air-overflow valve, arranged closely to the high pressure power cylinder, is cooled still more. The cylindrical air-overflow valve 43 closes slightly ahead of the check valve 34, as will be explained more fully hereinafter, thereby preventing hammering of the check valve. The cylindrical valve offers less heat-exposed surface to the hot gases, while being closed, than the check valve, which latter is well protected against hot gases by the cylindrical valve which is fitted snugly within a sleeve 46, the sleeve being inserted tightly within the main casing. The air-overflow port and the gas and air-overflow port should be as short as possible, but of sufficient area to permit of quick overflow without undue air- or gas-pressure-losses. This is only possible, if the air compressor and the low pressure power unit are separate units, as illustrated. The cylindrical valves, as illustrated, are operated by cams and springs etc. Any known positive return valve motion can be used instead of the design shown, if desired. The purpose of the cylindrical gas and air-overflow valve has been explained hereinbefore. Its construction and operation will be set forth and explained more fully hereinafter, in connection with another drawing.

Referring to the low pressure power unit, as illustrated, the cylinder 60 is secured within the main casing 21. The low pressure power piston 61 is driving the crankshaft by means of connecting rod 62. 103 is a piston top plate, semi-heat insulated from the piston, as shown in a sectional drawing hereinafter. The cylinder head is hollow. Hot air or gases preferably are circulated within the head. Pipe 72', preferably heat-insulated (not shown) permits hot air to enter into the cylinder head and pipe 73 permits air to emerge from the head, for reasons explained hereinafter. The cylinder head contains exhaust valve 63 and exhaust port 65. 65' are openings provided within the exhaust pipe, permitting exhaust gases to enter into the hollow cylinder head, maintaining the latter at fairly high temperature, for reasons explained more fully hereinafter. It is not necessary to simultaneously admit hot air and exhaust gases into the cylinder head. Either hot air or exhaust gases may be used for maintaining the cylinder head at high temperature, but not necessarily both simultaneously. If both air and gas are used, the air-outlet pipe 73 is not required. There is no danger of over-heating the exhaust valve, because exhaust through the valve takes place substantially at atmospheric pressure and at relatively low temperature, for reasons which will now be explained. 106 are piston controlled exhaust ports, like ports used in ordinary 2 cycle engines, in connection with a separate cam-operated valve, for scavenging, internally air-cooling and supercharging an internal combustion power unit. Applicant's low pressure power unit is not an internal combustion power unit. It does not require scavenging nor internal air-cooling. On the contrary, it should be maintained throughout as hot, as safe and permissible. For this reason, gas port 106', as shown, is extended axially inwardly, externally heating the axially inner end portion of the low pressure power cylinder by exhaust gases, or by hot air, as will be more fully explained hereinafter. The object of the valve controlled exhaust port, is, to permit gases to escape freely until the piston reaches approximately outer dead center position which is totally different from ordinary 2 cycle engines. The use of a piston controlled exhaust port, in combination with a separate valve controlled exhaust port, in connection with applicant's power cylinder, is important. It permits relatively hot exhaust gases to escape through the piston controlled exhaust port, before the valve controlling the separate exhaust port is opened. Exhaust gases pass out through the valve about at atmospheric pressure and at relatively low temperature, almost during the entire outward piston stroke, producing a relatively strong cooling effect on the valve and on the valve seat, as a result of strong heat-convection, between the relatively cool outflowing gases and the hot valve and valve seat, while the axially inner cylinder head wall surface may remain relatively hot, which is desirable for reasons explained more fully hereinafter. Another very important, novel reason for employing a quick opening, piston controlled, large area exhaust port, in connection with applicant's engine, is, to permit very quick scavenging and internal air-cooling of the high pressure power unit, which is essential for the operation of the engine, as will be shown and explained more fully hereinafter.

During low pressure power stroke, gas pressure and pressure of springs 66, keep the exhaust valve closed. During exhaust, the valve is pushed open by push rod 70 and by other mechanism, partly shown heretofore and illustrated and explained more fully hereinafter.

69 is a soft copper ring, or the like, ground to the head before the ring is cut into three sections. 110 is a sleeve, forced down on the ring and cylinder head, which latter is ground and forced down gas-tight on the cylinder. 75' is a starting air-inlet port for the low pressure power unit, cooperating with the air compressor unit starting air-inlet port 75, mentioned hereinbefore. Both starting air-inlet ports permit starting air to enter into the respective units at the time the respective pistons pass through outer dead center positions. Starting air must be cut off at or before the air compressor piston opens the starting air-outlet port 23' and before the low pressure power piston opens the exhaust port 106. As illustrated, check valve 75a and check valve 75'a, prevent leakage of compressed air or gas during operation. Cam operated valves, or the like (not shown) provide proper timing of starting air inlet, in any convenient known manner. Subject to the above construction and conditions, air compression always starts with about atmospheric pressure, producing substantially the same amount of supercharging of the high pressure power unit, during air starting, as during operation on fuel. If desired, the engine may run simultaneously on starting air and on fuel for several revolutions, before starting air is cut off.

Considering applicant's very high compression, fuel injected, should ignite immediately, while starting. Assuming nevertheless that fuel should fail to ignite during the first injection, applicant's method of scavenging would not permit any fuel to remain within the high pressure power unit during scavenging or during compression period. Applicant's original method of air-starting, therefore is absolutely safe and provides instant starting with maximum torque.

As within compound steam engines, the object of externally heating the low pressure power unit walls, as illustrated, is, to reduce the specific heat losses, while transforming the greatest possible amount of the specific heat of steam and gases into kinetic energy, thus increasing thermodynamic efficiency of the engine. We will refer to low pressure power unit construction more fully hereinafter, in connection with later drawings.

Fig. 4, represents a vertical cross-section of portions of the air compressor unit, while some parts are shown in elevation. Lever 78 oscillates around a pin supported within bracket 79, arranged on sleeve 40. Rollers 80 are arranged at both ends of the lever. Push rod 82 is guided within bracket 81, attached to sleeve 40. A cap 83 is screwed to the end of the push rod, being kept in contact with a finger arranged on lever 85 (shown in Fig. 1). A position plate 86 is secured to the main engine casing, having notches for a snap lock, arranged on lever 85, in known manner. The object of these devices, is, to keep the air-inlet valve open, as long as lever 85 (Fig. 1) is locked in left position, while starting the engine by electric power or the like in known manner (not shown). After a few revolutions, the lever 85 is shifted and locked in right position, whereupon fuel injection is started. This air pressure relief during electric starting is designed only for relatively large power units. Small power units, such as used for auto service, or the like, do not require such air-pressure-relief devices. If air-starting is used, as explained hereinbefore, the above mentioned devices are left off.

In connection with great supercharging and very high compression within the air compressor cylinder, it is advisable to liquid-cool the air compressor unit cylinder substantially at its entire length, as shown, in order to keep the piston rings sufficiently cool and in order to prevent super-heating of the air-overflow valves. The maximum air temperature with the high pressure power unit will thus be reduced somewhat, but the weight and density of the air is increased. This is important for two reasons, first, it will permit increase of M. I. P., without dangerously increasing maximum temperatures during combustion and secondly, density of air and gases, with the same compression, is increased. Density of air has been proven to be even more important in reducing lag of ignition than air temperatures.

Referring now to Fig. 5, representing a vertical cross-section through the high pressure power unit, on line 5—5 of Fig. 3 and referring to Fig. 5a, showing horizontal cross-section through Fig. 5 on line 5a—5a, a step-piston, similar to the one illustrated herein, has been used heretofore, acting as cylindrical crosshead and as air pump, taking up side-thrust caused by connecting rod and slightly supercharging a Diesel engine power unit. In applicant's engine, the step-piston is not employed for supercharging the power unit, because the timing required for supercharging, etc., necessitates the use of a separate air compressor unit, as will be explained hereinafter in connection with charts (Figs. 14 to 16), indicating relative simultaneous piston and crank positions, within the three units. The novel feature in connection with applicant's step-piston, as illustrated in Figs. 5 and 5a, consists, in producing twirl of cooling air within the annular air-space 48', formed between the slide or air cylinder wall 48 and the high pressure power piston 46. During each inward piston stroke, cool air is drawn into the air cylinder tangentially, through port 100 of inset 92 (Fig. 5a), producing strong cooling air twirl around the high pressure power piston. During outward piston stroke the heated air is expelled. The design shown in Fig. 5a is intended for uniformly air-cooling high pressure power pistons of small motors. Internal and external power piston cooling, are specifically shown and explained and claimed in applicant's copending application, Ser. No. 397,087.

Referring now to Fig. 6, representing a vertical cross-section through the low pressure power unit, most features have been explained hereinbefore. The semi-heat-insulated top plate 103 of the power piston, as shown, acts totally differently from known internal combustion power unit gasifier plates, which break up and gasify fuel. As stated, applicant's low pressure power unit is no internal combustion power unit. It is a fluid expansion unit. No fuel is injected and substantially no combustion takes place therein, and heat-conditions therein are totally different from those within an internal combustion power unit. By constructing a hollow top plate or cap, producing an hermitically closed space, filled by heat-insulating fluid or material, the cap can be made of relatively thin forged steel, making it a very poor heat-conductor, because of its very small sectional heat-conducting area, thus greatly reducing heat conduction to the piston rings and from there to the cylinder wall. Heat conduction must be avoided, as much as possible, within the cylinder low pressure power unit. In order to realize the importance of this, it is only necessary to mention, that the low pressure power unit heat-exposed top piston surface and the bottom cylinder head surface, as illustrated, are each about six times as great as within the high pressure power unit, while the low pressure unit cylindrical surface, as illustrated, is about four times as great as within the high pressure power unit. After completion of combustion, gases cool off very rapidly as a result of expansion heat-radiation, heat-convection and heat-conduction. Gases can not draw from a reservoir of latent heat, like steam, when expanding to near atmospheric pressure. On the other side, total pressure and temperature ranges within applicant's engine, are many times as great as within a non-condensing, compound or triple expansion steam engine.

Because gases may start to overflow from the high pressure power unit into the low pressure power unit at temperatures of 2000 degrees F., more or less, and because high quality lubricating oil will carbonize at about 650 degrees F., the axially outermost low pressure power cylinder wall portions preferably should be liquid-cooled externally, as shown, in order to assure therein sufficiently low internal cylinder wall surface temperature, producing proper lubricating conditions, while axially middle and axially inner wall portions, which are exposed to temperatures of less than 650 degrees F., are preferably surrounded by gases, as shown, or by heat-insulating space or material, thus reducing heat-losses and increasing thermodynamic efficiency of the engine. All of the above features assist in maintaining internal heat-exposed wall surfaces as hot as permissible, with safe operation, saving much heat, a great portion of which can be changed to kinetic energy, as will be explained more fully hereinafter.

The piston-controlled exhaust ports 106 of large area and the large gas- and air-space surrounding the cylinder, assist in producing almost instantaneous drop of gas-pressure within the low pressure power cylinder, to about atmospheric pressure, at the moment of opening of the exhaust port, which is of greatest importance in producing almost instantaneous scavenging and internal air cooling of the high pressure power unit, during 20 degrees, more or less, turn of the crankshaft, as explained more fully hereinafter.

The operation of the cam-controlled exhaust valve 63, is as follows. Top lever 113, as shown, swings around a pin secured within bracket 112. Rollers 116 are arranged revolvably on pins extending through lever 113. The cam, 122, revolving with camshaft 96, forces roller 120 and plunger 119 upwardly within bracket 121, pushing rod 118 against roller 116, forcing roller 116 at the other end of lever 113 against rod 70, thus opening the exhaust valve, which is kept open from about 140 degrees past outer dead center piston and crank position to about 30 degrees ahead of outer dead center piston and crank position, in order to produce compression before gas and air over-flow from the high pressure power unit starts.

Fig. 7 illustrates operation of the cylindrical cam-driven air-overflow valve 43. As illustrated, cam 97, revolving with camshaft 96, pushes against roller 95, supported revolvably within the lower end of lever 94, swinging around pin 94' supported within bracket 99, attached to casing 21. Roller 95, arranged rotatably within the upper end of lever 94, pushes valve 43, sliding within sleeve 127, towards the right, whenever cam 97 pushes the lower roller 95 towards the left. The spring 123, resting with its right end against tubular member 124, keeps the valve in permanent contact with the upper roller 95. A position pin 125, within the cylindrical valve and a slot 126 within sleeve 127, guides the valve in such manner, that while the valve is pushed towards right, communication is established between ports 42 and 42', permitting air to flow from the air compressor unit into the high pressure power unit. As illustrated, the valve is in left position, with the ports closed. The valve has resilient packing rings 43', producing air-tight joints, valve cooling and lubrication, while the valve itself is fitted loosely within sleeve 127, pressed into the main casing. As illustrated, the casing 21 is secured to the crankcase 88 by long studs and nuts, in known manner.

It is obvious, that instead of depending on return spring action, positive return valve motion may be provided in convenient known manner, if desired.

Fig. 8 illustrates details of construction and operation of the cylindrical cam-driven gas-and-air-overflow valve 58. The valve is shown in position, wherein ports 57 and 57' communicate with each other, as shown and explained hereinbefore in connection with Fig. 3. The driving mechanism of the valve, comprises a roller 131, arranged revolvably on pin 131', secured within attachment 132, fastened to the gas- and air-overflow valve. Roller 131 is kept in close contact with the axially shiftable cam 130, by spring 128, pushing the valve toward right except while cam 130 forces roller 131, together with attachment 132 and valve 58 towards left, cutting off communication between ports 57 and 57' and between the high pressure and low pressure units. At normal motor speed, the gas- and air-overflow port preferably is exclusively controlled by the high pressure power piston, while at less than normal motor speed, the cam operated valve 58, during scavenging is partly or entirely closing the gas- and air-overflow port in advance of the high pressure power piston, thus maintaining the proportionate amounts of scavenging air and supercharging air approximately unchanged during varying engine speed, or if desired, reducing scavenging and internal air-cooling of the high pressure power unit and supercharging the latter with a correspondingly greater amount of air from the air compressor, at equally as high, or higher compression, at low speed, than at high speed, making it possible to burn an equally large, or greater amount of fuel within the high pressure power unit, per piston stroke, at overload, at slow engine speed, as at normal engine speed. Applicant's gas and air-overflow regulation does not interfere in any way with speed regulation produced in known manner by automatic regulation of fuel injection, on the contrary, it assists speed regulation at overload, by providing sufficient air, to produce complete combustion, while simultaneously supercharging with fuel during overload in known manner, not shown herein. Its purpose, as partly explained hereinbefore, is, to start quickly and to operate at considerable overload during short periods, without compressing a large excess of air at normal or high motor speed, as more fully explained hereafter. Applicant's automatically speed controlled gas and air-overflow valve, is of special advantage in connection with variable speed, supercharged, compound, Diesel engines in connection with marine, aeroplane, locomotive, automotive, engines, etc., whereas with stationary so-called constant speed engines, the speed controlled valve is less adaptable. This will be discussed more fully hereinafter.

Fig. 9 illustrates a horizontal cross-section through the engine on line 9—9 of Fig. 3. It shows more clearly the low pressure power unit power piston controlled exhausts port. As illustrated, it permits of more efficient scavenging, internal air-cooling, supercharging and compression within the high pressure power unit of a compound Diesel engine, than heretofore. It permits of great expansion, because scavenging and internal air-cooling can be accomplished during a relatively very small angular turn of the crankshaft, as a result of sudden wide opening of the exhaust port, while compression within the air compressor unit, simultaneously, may be one atm., more or less, over and above atmospheric pressure, at normal load. It has not been shown heretofore in connection with a compound Diesel engine, in the same manner as illustrated and set forth herein. All of this will be better understood in connection with charts shown and explained hereinafter, indicating relative crank and piston positions within the three units.

Fig. 10 illustrates a horizontal cross-section through the engine on line 10—10 of Fig. 3, showing valves and ports, particularly tangential termination of port 44 into the high pressure power unit. This becomes possible by placing a threaded high pressure power cylinder into the main casing, while ports 42 and 42' are drilled through port 76, with the valve 43 placed in correctly timed position for air-overflow. Port 44 is drilled into the cylinder wall, before the cylinder is screwed into the main casing. Ports 57 and 57' are drilled through port 75' while valve 58 is placed into properly timed position. As illustrated, the high pressure power cylinder wall is uniformly liquid-cooled, preferably by forced cooling liquid circulation, through ports 45'. Applicant claims that his cylinder-construction, including a tangential port passing through the cylinder wall, in combination with his taper-cylindrical compression chamber, provide ideal, novel means, producing and maintaining powerful twirl.

Referring now to Figs. 11 to 13, indicator diagrams are shown, of a character aspired to by applicant. Fig. 13 represents an air compressor unit diagram, Fig. 11 shows a high pressure power cylinder diagram and Fig. 12 is a low pressure power cylinder diagram. The full lines represent diagrams at normal load and the dotted lines represent diagrams at overload, while the valve 58 is closing the gas- and air-overflow port at least partly in advance of the high pressure power piston.

M. I. P. of 200 lbs., more or less, has been obtained normally with 50 per cent, more or less, supercharging, with a waste of exhaust pressure gases at over 6 atm., in commercial non-compound Diesel engines built abroad, using strong internal air-cooling and employing a power piston not exposed to any side thrust, showing no measurable cylinder wear after 10,000 hrs. of operation, proving, that many times as high M. I. P. can be used permanently and commercially, as is used in most non-supercharged 2 cycle Diesel engines at present.

Applicant believes that as a result of his improved method of internal and external high pressure power cylinder and cylinder head cooling, and as a result of other important novel improvements set forth and explained more fully hereinafter, 300 lbs. or possibly 400 lbs. M. I. P., may be safely utilized within his high pressure power unit, while 75 lbs., more or less, M. I. P., may be obtained within his low pressure power unit, at normal load.

Referring to permissible temperatures, 1500 degrees to 1600 degrees F., were originally considered maximum safe limits, with slow running Diesel engines. With present metals, lubricating oils, internal air-cooling etc. about twice as high momentary maximum temperatures are permissible in high speed Diesel engines. With maximum gas temperatures of 1600 degrees F. compounding was impractical, though Diesel believed in it.

Applicant believes, that maximum temperatures of about 2500 degrees F., during 60 degrees, or possibly 90 degrees turn of crankshaft, will be entirely safe and practical in connection with his high pressure power unit, provided his system of internal air-cooling is used and provided temperatures do not rise above the aforesaid maximum limit. With a power piston not exposed to side thrust, with great supercharging and high compression, with powerful twirl continuing throughout scavenging, supercharging, high compression, fuel inlet and combustion, and with late, properly regulated fuel injection, pressures and temperatures, can be controlled almost perfectly, while producing extremely high M. I. P. Only tests can finally determine maximum M. I. P. permissible with applicant's vastly improved air-cooling method and with reasonably high maximum temperatures, such as recommended by applicant.

Figs. 14 to 16 represent charts, indicating simultaneous, successive, crank and piston positions within the three cylinder units, giving a clearer picture of the operation of the engine. In connection with these charts, we shall explain the action within each unit and the cooperation of the units.

Fig. 14 relates to the air compressor unit, Fig. 15 relates to the high pressure power unit and Fig. 16 relates to the low pressure power unit. Letter $f$ (Fig. 15), indicates high pressure power unit crank and piston positions in outer dead center during maximum compression, with fuel injection just about beginning. Letter $f$ (Fig. 16), indicates low pressure crank and piston positions 110 degrees ahead of outer dead center, during outward piston stroke, discharging gases through the exhaust valve, while $f$ (Fig. 14) indicates air compressor crank and piston positions, 40 degrees past outer dead center, drawing air into the air compressor unit. Letter $a$ (Fig. 15) indicates high pressure power unit crank and piston positions, 110 degrees past outer dead center, just beginning to permit gases and air to overflow from the high pressure power unit into the low pressure power unit. Letter $a$ (Fig. 16) shows simultaneous outer dead center crank and piston positions of the low pressure power unit, just beginning to receive gas and air overflow. Simultaneous crank and piston positions $a$ of the air compressor unit (Fig. 14), are 150 degrees past outer dead center.

Positions a are the crank and piston positions illustrated in Figs. 3, 4, 5, 6, etc.

Letter b (Fig. 15) indicates crank and piston positions 130 degrees ahead of outer dead center, while simultaneous crank and piston positions b (Fig. 16) are 120 degrees past outer dead center, wherein the low pressure power piston just begins to open the exhaust port. Simultaneous crank and piston positions b (Fig. 14) are 90 degrees ahead of outer dead center, wherein compression may have reached about 1 atm., over and above atmospheric pressure, at normal load, and wherein the piston compresses air at maximum velocity.

Starting with positions b and up to positions c, during 20 degrees turn of the crankshaft, it will be understood, that at normal and at higher speed and load, the valves within the air-overflow port, as well as within the gas and air overflow port preferably are wide open, while the power piston controlled exhaust port of the low pressure power unit is opened very quickly permitting quick scavenging and efficient internal air-cooling of the high pressure power unit, by causing sudden violent rush of relatively very cool air, into the outermost end portion of the high pressure power cylinder, the air and $CO_2$ gases flowing spirally inwardly through the cylinder, through the gas and air overflow port, through the low pressure power cylinder and out through the piston controlled exhaust port. The letter c (Fig. 15), indicates the high pressure power unit crank and piston positions 110 degrees ahead of outer dead center, wherein the power piston has just closed the gas and air overflow port on its outward stroke, thus starting supercharging and simultaneous, joint, air compression within the air compressor unit and high pressure power unit.

Referring now to the next following 60 degrees turn of the crankshaft, from c to d, compression takes place simultaneously and jointly within the air compressor unit and high pressure power unit. At d, the cylindrical valve controlling the air overflow, closes the port, while compression continues to increase rapidly, solely within the high pressure power unit, until outer dead center crank and piston positions f (Fig. 15), are reached again, whereupon the same operations are repeated.

It may be assumed, that within the illustrated engine, 50 per cent, more or less, of the total amount of air discharged by the air compressor unit, at normal load, is used solely for scavenging and internally air-cooling the relatively very small high pressure power cylinder and cylinder head, while the remaining 50 percent, more or less, of the air is discharged into and compressed within the high pressure power unit, at normal load, supercharging the latter 200 per cent, more or less, over and above 100% pure air-charge, producing compression pressure at 65 atm., more or less, at normal load. During normal and overload, gas-pressure within the power units and the air-pressure within the air compressor unit, during crank and piston positions at b may simultaneously be about one atmosphere, more or less, over and above atmospheric pressure. With sudden opening of the low pressure power piston controlled exhaust port, pressures quickly drop within all units. Slight overpressure continues within the air compressor unit, up to crank and piston positions c. At low load, pressures within the three units may already have dropped approximately to atmospheric pressure, while cranks and pistons are in position g. At low load, scavenging air of the high pressure power unit, therefore, may start already to overflow, while the cranks and pistons reach about positions g. With air compressor unit piston displacement and low pressure power unit piston displacement being about alike, as illustrated, pressures within the three units, at low load, may remain about at atmospheric pressure, while the cranks and pistons travel from g to c.

The speed regulated gas- and air-overflow valve may be used in connection with any 2 cycle compound Diesel engine, but it is mainly of importance in connection with so-called variable speed engines, working within wide speed limits, adding to flexibility. Variable engine speed, in an ordinary compound engine, would greatly influence the volume of scavenging air over-flow. During slow engine speed, a much greater amount of scavenging air would overflow, thus reducing the amount of supercharging air and reducing compression at low engine speed, while at high engine speed, less scavenging air would overflow, producing less internal air-cooling and correspondingly greater supercharging and compression, under otherwise similar conditions. Unless means are provided to counteract this tendency, supercharging and compression become insufficient at low speed and the engine may not produce sufficient torque. At high engine speed, opposite conditions would prevail and supercharging and compression might become excessive. Applicant desires to maintain compression and supercharging approximately uniform, at variable engine speed. He believes this can be accomplished by using his speed-controlled gas and air overflow valve, producing a flexible, reliable, safe engine, at all reasonable engine speeds. At beginning of supercharging, at low load, the air compressor pressure is somewhat lower than at normal load, because scavenging and air overflow is starting earlier. As a result, supercharging automatically increases with load, producing an efficient, flexible engine. The speed-regulated gas- and air-overflow valve increases supercharging at overload at low engine speed, as explained hereinbefore. Applicant assumes, that at low load, compression may be up to 55 atm., while during normal load, compression may be up to 65 atm. and during overload, compression, with the gas- and air-overflow valve closing the gas- and air-overflow port in advance of the high pressure power piston, compression may be about 75 atm. The engine will run smoothly and safely at all loads, because supercharging and compression are well controlled, as a result of peculiar relative crank and piston positions and because of the properly timed gas- and air-overflow and exhaust outlet.

In short, as illustrated, following five essential successive operations take place during each crankshaft revolution, at normal load:

1. Fuel injection, combustion and part-expansion within the high pressure power unit, during 110 degrees, more or less, turn of crankshaft.

2. Gas and air, still under tension of 20 atm., more or less, simultaneously and jointly expand within both power units during the next following 120 degrees, more or less, turn of cranshaft.

3. After opening of the low pressure power unit exhaust port (either by piston or valve or by both) scavenging and internal air-cooling take place within the high pressure power unit, during 20 degrees, more or less, turn of the crankshaft.

4. Simultaneous, joint compression, takes place within the air compressor unit and the high pressure power unit, up to 10 atm., more or less, during 60 degrees, more or less, turn of crankshaft, while supercharging the high pressure power unit.

5. Compression takes place solely within the high pressure power unit during the remaining 50 degrees, more or less, turn of crankshaft, up to 65 atm., more or less.

Applicant does not limit himself to the above-mentioned degrees of angular turns of crank shaft, nor to the pressures mentioned above, but he considers these five successive basic operations essential for efficient operation of the engine. He only mentions the given periodical periods of angular turns as examples producing good results under certain conditions. If, for any reason, it should f. i. become advisable to increase the period of scavenging and internal air-cooling, from 20 degrees say to 40 degrees turn of crankshaft, this can be done, f. i. by decreasing *f—a* (Fig. 15) to 100 degrees (while *a—b* may remain 120 degrees, as heretofore), and while simultaneously reducing *c—d* from 60 degrees to 50 degrees. Again, if it should be desirable to apply scavenging and internal air-cooling during 50 degrees turn of the crankshaft, this could be done, f. i. by simultaneously reducing *a—b* from 120 degrees to 110 degrees turn of crankshaft. It is evident, that any one, or all of the above mentioned five separate periods of operation may be changed, by simultaneously changing one or more of the other periods of operation. It becomes a matter of compromise under various conditions. Applicant established new basic principles, regulating and controlling scavenging and internal air-cooling and supercharging and compression, respectively, within the high pressure power unit. Details must be worked out by mechanics depending on tests made in known manner.

Referring shortly to Figs. 17 to 19, the charts indicate crank and piston positions of a second complete set of units (not shown) preferably driven by and driving an extension of the illustrated crankshaft. As shown, the air compressor unit (Fig. 17), the high pressure power unit, (Fig. 18) and the low pressure power unit (Fig. 19) respectively, show crank and piston positions, offset 180 degrees from those of the illustrated units, the purpose being, to produce uniform torque. The construction of these three units, are identically the same as those illustrated and therefore requires no illustration nor description.

Referring now to fuel heat losses in connection with well designed Diesel engines, 65 per cent, more or less, of the intrinsic fuel heat value is wasted, about 25 percent as a result of exhaust losses and a similar additional amount of intrinsic fuel heat is lost as a result of heat-conduction through combustion chamber and cylinder-walls. The remaining 15 per cent loss comprises about 5 percent mechanical friction and various other unavoidable losses. It is generally admitted that reduction in mechanical friction can be neglected in any attempt to substantially reduce the present tremendous waste of fuel. The great problem in Diesel engines, recognized by the originator a half century ago, still remains to be the transformation of a greater portion of the intrinsic heat value of fuel into power. Diesel believed in compounding, but conditions were not yet ready for this additional revolutionary step. Innumerable improvements were made in Diesel engine construction since then. Scavenging, internal air-cooling, methodical turbulence, increased compression, airless fuel injection, improved fuel pumps and spray valves, introduction of improved and new metals and lubricating oils etc., made it possible to greatly increase the M. I. P. and the speed of engines and to reduce the weight per B. H. P. to a small fraction of the original weight.

It is strikingly characteristic, that in spite of the enormous progress in Diesel engine construction, during the past generation, fuel consumption per B. H. P. has been reduced but very little. Because Diesel engines have now entered into vast new fields of usefulness, cheaper power and saving of fuel in Diesel engines is becoming of universal importance. Experience and science clearly point to great supercharging and high compression and compounding, as the only possible solution of the problem of greatly reducing fuel consumption in Diesel engines.

The fundamental thermodynamic advantages of a greatly supercharged compound, high compression, Diesel engine, are:

*First.*—Greatly increased total pressure range. Compression of about 25 to 1 and expansion of 1 to 50, more or less, are entirely feasible within a properly designed highly supercharged, compound, Diesel engine. Gas pressures, towards end of expansion, become relatively low, but volume becomes 50 times as great. Compounding permits utilization of almost the entire expansive power of the vast volume of gas and air. Applicant believes that a great portion of the total exhaust pressure and heat losses, amounting at present to about 25 percent of the total fuel heat value, can thus be saved.

*Secondly.*—Heat-absorption and heat-conduction losses, under otherwise similar conditions, are proportional to heat-absorbing surface area and to heat-conducting cross-sectional area. As a result of many times the usual M. I. P. within applicant's very compact high pressure power unit, the heat-exposed, heat absorbing and heat-conducting areas, during combustion, are only a small fraction of what they are within ordinary Diesel power units, developing the same B. H. P. It follows, that heat-absorption and heat-conduction losses, within applicant's high pressure power unit, can only be a small fraction of what they are within ordinary Diesel power units per B. H. P. As stated, ordinary heat-conduction losses are 25 percent, more or less, of the entire fuel heat value. Applicant believes, that the greater portion of these latter losses can be avoided, by using great supercharging and a very compact combustion chamber and very high M. I. P. and by compounding.

Referring now specifically to applicant's low pressure power unit, heat-absorption losses and heat-conduction losses, within the latter power unit, can only be relatively very small, first, because of relatively small total temperature ranges within this unit, secondly, because of exterior heating or heat-insulation of large wall portions, thirdly, because gases and air, overflowing from the high pressure power unit into the low pressure power unit, during scavenging, are far above atmospheric temperature, greatly reducing heat losses, by maintaining the internal low pressure power unit wall surfaces relatively hot at all times.

Because, as stated, heat-absorption and heat-conduction losses within both power units are relatively very small, the gases are maintained throughout expansion at relatively much higher temperatures and pressures, than within non-compound Diesel engines, resulting in reasonable final exhaust pressures, at reasonable loads, even with expansion of 1 to 50, provided compression of about 25 to 1 is used.

Compression losses, in applicant's engine, are relatively very small, first, because only a small amount of air, over and above the theoretically required amount, is compressed during reasonable loads, and secondly, because air and gas expand almost to atmospheric pressure.

Scientific research established the fact, that heat-exposed wall surfaces of a combustion chamber, momentarily become red-hot, skin-deep, as a result of intense heat-radiation and heat-convection of hot gases. Wall temperatures drop off very rapidly at slight distance from the heat-exposed wall surfaces. Heat-radiation increases with the fourth power of temperature difference, while heat-convection increases with the volume, velocity and temperature difference between gases and metal contacting with each other. The heat-exposed wall surfaces absorb heat, skin-deep, much more rapidly, than the relatively slowly heat-conducting metal wall can conduct heat from the inner towards the outer wall surface.

At the moment the inner wall surface of the combustion chamber becomes approximately as hot as the gases, that is saturated with heat, it practically ceases to absorb heat, but reflects heat-rays. This limit of heat-absorption, or rather of heat-conduction through the metal wall, while producing extremely high thermodynamic efficiency within applicant's greatly supercharged high-pressure power unit, at extremely high M. I. P. and mean gas-temperatures, simultaneously is setting a limit, at which lubrication can function and at which ultimately metal will stand up. Extremely strong internal high pressure power cylinder air-cooling and internal power piston cooling, for the above reasons, are the crucial factors, raising permissible M. I. P. Because axially outer portions of the combustion chamber are exposed to greatest heat, for relatively long periods, as a result of very high compression and late and very gradual injection of a relatively large amount of fuel, during each crankshaft revolution, applicant, as stated, conceived the original idea, of discharging, during scavenging, a large amount of air, at one atm., more or less, above atmospheric pressure, at about atmospheric temperature, directly into the axially outermost end portion of the combustion chamber, preferably partly axially outwardly of outer dead center piston position, tangentially and preferably in axially outward direction, producing very efficient scavenging and powerful internal air-cooling and gas air twirl, primarily, within the outermost end portion of the cylinder and within the cylinder head, while the air-overflow port, the gas- and air-overflow port and the low pressure power unit exhaust port, simultaneously, are wide open. After completion of scavenging, supercharging with pure air, takes place through the same air-inlet port, producing additional strong twirl and internal air-cooling during a portion of the compression period. Powerful twirl of extremely hot dense air is a theoretically well established factor, in breaking up and gasifying fuel as a result of greatly increased friction and heat-convection between fuel, gases and air. It accelerates ignition and produces more instantaneous complete mixture of gas and air, resulting in quick, complete combustion. However, powerful twirl, of pure, cool air, primarily within the axially outer portions of the combustion chamber, of non-supercharged compression-ignition power units, heretofore, has never been employed, nor recommended, because this would produce excessive heat losses. As a result of extremely great heat-concentration, the wall surface of the combustion chamber almost instantaneously becomes red-hot, as proven by temperature measurements.

Applicant contends that just as instantaneously as the wall surface becomes red hot the wall surface becomes cooled off again with expansion of gases, as a result of reverse heat radiation and heat-convection between wall and gases, transforming the heat retransferred to the gases instantaneously into kinetic energy. Heat waves undoubtedly act equally in each direction. With instantaneous heat-radiation and heat-convection, at very high engine speed, a great portion of the heat, therefore, is reabsorbed by the gases and is utilized as energy, before the heat penetrates much below the wall surface and is lost. In other words, with increased engine speed, thermodynamic efficiency is greatly increased. Applicant's above said original conclusions are borne out by research work and are proven by practical experience in high speed engines, wherein greatly increased air and gas-pressure losses, caused by drawing air into and by forcing gas and air to flow out of the high pressure power cylinder, are substantially balanced by thermodynamic gains.

As a result of applicant's very compact cylindrical combustion chamber, the amount of heat absorbed per B. H. P. by the combustion chamber wall surface, is much less than within ordinary engines. However, the portion of this latter amount of heat which is successively reabsorbed by the gases, (the equivalent of internal surface air-cooling), as a result of return heat-rays and heat-convection during continuous powerful gas twirl, during vast gas expansion, is relatively greater, than within ordinary engines, before scavenging and internal air-cooling set in again as explained hereinbefore. Heat absorbed by scavenging air within the high pressure power cylinder, furthermore, enables maintaining the inner low pressure power cylinder surface at relatively high temperature, as stated, thus greatly reducing low pressure power cylinder wall surface heat absorption and heat conduction losses, during the power stroke, increasing M. I. P.

It will now be better understood, that while hot gases momentarily heat surfaces skin-deep, cooling gases and air momentarily cool surfaces skin-deep, sufficiently, for successfully spreading lubricant on high pressure cylinder wall surfaces and on the piston rings, etc., during outward piston stroke.

Referring to the question of safe gas temperatures, maximum temperatures of 3000 degrees F. more or less, have been reached in commercial high speed Diesel engines during few degrees turn of crankshaft, during each revolution. Applicant is convinced, that with very high compression within a very compact taper-cylindrical compression- and combustion-chamber, or the like, with powerful gas- and air-twirl and with late, very gradual fuel injection, combustion and temperatures can be far better controlled than heretofore and that maximum temperatures can normally be maintained at about 2500 degrees F. while M. I. P., nevertheless, may be maintained many times as high as within ordinary engines. This latter temperature should offer a safe margin, to which wall surfaces can be exposed during 60 degrees, more or less, turn of the crankshaft, provided, applicant's method of extremely powerful internal air-cooling of the axially outer portions of the combustion chamber are employed. Simultaneously, applicant provided other important precautions against carbonizing of lubricating oil on piston rings and cylinder wall surface, during the compression stroke, as shown and mentioned hereinbefore. With great supercharging and very high compression, air temperatures, during the last inch or two, before the power piston reaches outer dead center position, become considerably higher than within ordinary engines. For this reason, applicant placed the piston rings further axially inwardly than customary, while simultaneously providing novel, very efficient additional, internal high pressure power cylinder and high pressure power piston air-cooling, which latter are shown and explained in applicant's co-pending application, Serial Number 397,087. All of the aforesaid cylinder and piston air-cooling features, cooperate in producing conditions, which are a necessary requisite for proper lubrication and therefore for successful operation of a 2 cycle, greatly supercharged, high compression, compound, Diesel engine, such as illustrated and set forth by applicant.

Illustrating the action within the combustion chamber more graphically, small fuel drops enter into very dense air, at velocities of 500 to 1000 ft. per sec. At these tremendous velocities, fuel drops flatten instantly and break up into innumerable minute particles, shown and measured from instantaneous photographs. The finer the fog becomes, the greater becomes its total surface exposed to the dense air which now may have a temperature of 1250 degrees F., more or less. Because of powerful twirl of air and heat-convection, supported by heat-radiation, resulting in extremely high concentration of heat units, a large portion of the fuel vapor is gasified, mixed with air and raised to ignition temperature, almost instantaneously. As soon as ignition sets in strongly, temperature and heat-radiation increase suddenly, causing more sudden gasifying, ignition and combustion of slightly accumulated fuel, and rise of pressure, but not in the manner characteristic in lower compression engines. Applicant's main object, is, to prevent as much as possible, accumulation of fuel, by starting ignition quickly during beginning of fuel injection, which is accomplished, in accordance with known scientific research work. Experience may show, that compression of 80 atm. or even higher, may give best results.

Applicant mentioned hereinbefore, that close parallel action exists between a greatly supercharged, high compression, compound Diesel engine and a high pressure, superheated, non-condensing compound or triple expansion steam engine, with late steam cut-off. Following striking similarities exist:

1. In both cases, exhaust pressure and exhaust heat-losses are very much reduced, by utilizing much greater expansion and much greater total pressure and temperature ranges than in non-compound engines.

2. In both cases, heat-absorption losses by wall surfaces, or rather heat-conduction losses through walls, per B. H. P., are reduced to a fraction of corresponding heat-losses within non-compound engines.

3. In both cases, heat losses, within the low pressure power cylinder, are greatly reduced by exterior heat-insulation or superheating of portions of heat-exposed walls.

4. In both cases, very great reduction of heat losses produce much higher mean temperatures and an equivalent of much higher M. I. P. or indicated horsepower, per given fuel consumption.

5. In both cases, as the result of many times as high M. I. P., without increase of maximum total pressure exerted at the power piston top, connecting rod- and crankshaft-strains, side thrust, bearing pressures, cylinder wall strains, etc., are reduced to a fraction of what they are in non-compound engines, per I. H. P. This means an extremely smooth running, safely operating compound engine, great reduction in wear and tear, and in maintenance expenditures.

6. In both cases, slight added mechanical friction and manufacturing expenses are negligible, as compared with the enormous saving in fuel and greater reliability, as the result of compounding.

The main points of difference are:

1. Total utilizable pressure and temperature ranges within a Diesel compound engine, are many times as great as within a non-condensing compound steam engine, which are additional important reasons for compounding a Diesel engine.

2. Gas does not contain latent heat, like steam, thus making it more imperative to externally heat-insulate or superheat low pressure Diesel power unit walls, than low pressure steam engine walls.

Considering the above facts, it is evident that a well designed greatly supercharged compound Diesel engine, will show at least as great relative thermodynamic and other advantages, as a non-condensing, compound or triple expansion steam engine.

In conclusion, research work proved, that explosion results from fuel accumulation caused during beginning of fuel injection, because of lag of ignition. Ignition means beginning of combustion. The most potent factor reducing lag of ignition and explosion, as proven, is very high compression.

Fear of very high compression and very high M. I. P. is disappearing, with Diesel engines being used successfully in aeronautical industries. Engineers no longer doubt the potential possibilities of very high M. I. P. However, there still prevails confusion within the minds of many mechanics, who, more or less, even today, assume wrongly, that very quick combustion means explosion. Research has proven, that the opposite of this vague assumption is true, provided fuel accumulation, within a combustion chamber, is substantially avoided during beginning of fuel injection, as a result of very high compression very compactly arranged, very dense, pure, hot air and powerful twirl of this dense, pure air. The quicker ignition and combustion set in strongly, during beginning of fuel injection, the less fuel accumulation and explosion are possible.

For reasons explained at the beginning of the specification, maximum compression within present Diesel engines, reaches about 40 atm., whereupon, after 20 degrees, more or less, turn of the crankshaft, explosion pressures may reach 80 or even 100 atm. Indicator diagrams of high speed engines show explosion motors, not what we have long since come to consider as Diesel engines. We are sacrificing smooth operation, in order to get quick and perfect combustion, high M. I. P. and high fuel economy. We employ low compression and depend on powerful explosion, momentary very high temperature and momentary powerful turbulence, caused near outer dead center piston position, in order to break up and gasify fuel and mix gas and air, thus producing complete combustion within the short time period forced on us by high speed engines. If great supercharging and very high compression, with powerful air twirl, were used, within a very compact cylindrical combustion chamber, as within applicant's high pressure power unit and as clearly pointed out by research work and science, as well as by practical experience, producing much greater pure air density and concentration of heat units, during beginning of fuel injection, combined with continuous strong twirl, during the entire period of fuel injection and combustion, fuel accumulation and explosion and late combustion would be greatly diminished or substantially avoided. Maximum pressures and temperatures could thus be controlled and maintained at lower levels than in present airless-fuel-injection, high speed, 2 cycle or 4 cycle engines, resulting in much smoother operation, greater reliability more uniform torque and in greatly reduced maximum pressures and strains, per I. H. P.

Successful development of a 2 cycle compound Diesel engine ultimately will reduce fuel consumption per B. H. P., to a fraction of what it is at present. It will greatly increase cruising radius or speed of ships and aeroplanes. It will increase reliability even of much greater power units than used heretofore. It will accomplish great individual as well as national saving in fuel.

The expression "Diesel engine" is used for brevity sake in the specification and in the claims. It means a compression-ignition engine, or what applicant would prefer to term a "super-high-compression" internal combustion engine, wherein air is preferably compressed to between 600 and 1000 lbs. per sq. in., with late and gradual fuel feed, in contrast with low compression internal combustion engines, wherein a fuel-air charge is slightly compressed and is exploded, either by spark or in other known manner.

The expression "supercharged Diesel engine," in the specification and claims, broadly means, that the air compressor unit cubic piston displacement is greater than the high pressure power unit cubic piston displacement and that during a portion of the high pressure power unit compression stroke, air continues to flow from the air compressor unit into the high pressure power unit at greater than atmospheric pressure.

The expression "scavenging air," in the specification and claims, refers to the quantity of air, flowing into the high pressure power unit, previous and up to the moment, at which the high pressure power piston closes the gas-and-air-overflow port. The amount of air escaping simultaneously through the gas-and air-overflow port, is of lesser quantity, because it is mixed with gases.

The expression "supercharging air," in the specification and claims, refers solely to the quantity of air, flowing into the high pressure power unit combustion chamber, after the high pressure power piston has closed the gas-and air-overflow port, supercharging continuing until the air compressor unit piston reaches approximately outer dead center position. The total amoutn of air accumulated within the high pressure power unit, at completion of supercharging, includes the additional air trapped within the latter power unit at conclusion of scavenging.

The expressions "load" and "engine load," as used in the specification and claims, are identical with torque and not with horsepower, which latter is proportional to the R. P. M., at a given load or torque.

"Combustion chamber," herein, means the chamber portion extending between the cylinder head and power piston, while the latter is 90 degrees, more or less, past outer dead center position.

Various changes in the designs may suggest themselves to a mechanic versed in the art and nothing contained herein, signifies in any manner, that applicant is limiting himself to the constructions shown and described herein, except as required by the claims appended hereto.

I claim:

1. In a two-cycle, supercharged, compound, Diesel engine, an air compressor unit, a high pressure power unit and a low pressure power unit, each of said units having a separate cylinder and piston and connecting rod and crank, a common crankshaft for said units, the cubic displacement of said air compressor piston and of said low pressure power piston being each at least twice as great as the cubic displacement of said high pressure power piston, the engine having an automatically controlled scavenging- and supercharging-air-overflow port between said air compressor unit and said high pressure power unit and having a high pressure power piston controlled gas- and air-overflow port between said power units and having an automatically controlled exhaust port for said low pressure power unit, the said units being arranged in series and in open communication with each other by way of said overflow ports during a portion of the air compressor unit compression stroke while said exhaust port is open simultaneously, the relative crank-angles of the engine and the air-pressure produced within said air compressor unit during the said portion of said compression stroke, and the said ports, being so arranged and controlled, that scavenging- and cooling-air is flowing from said air compressor unit during the said portion of said compression stroke through said high pressure power unit and successively through said low pressure power unit and through said open exhaust port, producing powerful scavenging and internal air-cooling of the high pressure power unit, whereupon said gas- and air-overflow port is closed, producing successively high supercharging and additional, internal air-cooling of and compression within the high pressure power unit, whereupon said air-overflow port is closed and said high pressure power unit piston produces higher compression solely within the high pressure power unit, the engine having a separate port serving as a fuel-inlet port and terminating into the compression chamber of the high pressure power unit.

2. A structure as in claim 1, wherein the air compressor unit piston and the low pressure power unit piston, each, are of the trunk piston type and wherein the high pressure power unit piston consists of an axially outer high pressure power piston portion sliding snugly within said high pressure power cylinder and of an axially inner portion serving as a crosshead and being guided axially in line with said high pressure power cylinder by a crosshead guide arranged axially inwardly from said high pressure power cylinder, the high pressure power unit piston stroke being from two to three times as great as the diameter of said axially outer high pressure power piston portion.

3. A structure as in claim 1, wherein maximum air-compression within the high pressure power unit, at normal engine load and speed, is 900 lbs., more or less, per sq. in., said crank angles and said ports causing about equal amounts of scavenging air and supercharging air to overflow from said air compressor unit, at normal load, supercharging and compression increasing and decreasing simultaneously with increasing and decreasing load, maintaining a uniformly compact compression chamber at maximum compression, producing extremely dense hot air, reducing lag of ignition and greatly accelerating combustion, resulting in safe, smooth operation at extremely high maximum M. I. P., throughout a large range of engine load, with late fuel inlet at normal load.

4. A structure as in claim 1, wherein the air-overflow port provided between the air compressor unit and the high pressure power unit is terminating tangentially into the axially outer portions of the high pressure power unit combustion chamber, said latter chamber being of such shape, that it permits of the substantially unobstructed continuous twirl of air produced during scavenging and supercharging, said twirl continuing throughout fuel inlet and combustion, said gas- and air-overflow port emerging from within said high pressure power unit cylinder further axially inwardly, the cool, pure scavenging air flowing from said air compressor unit through said air-overflow port into the said axially outer portions, producing therein, primarily, scavenging and powerful twirl and internal air-cooling, before the mixture of air and hot $CO_2$ gases flows spirally inwardly, escaping through said open gas- and air-overflow port and successively escaping through said low pressure power unit and said simultaneously open exhaust port.

5. In a two-cycle, supercharged, compound, Diesel engine, a cylinder air compressor unit, a cylinder high pressure power unit and a cylinder low pressure power unit, each of said units having a separate cylinder and piston, a common crankshaft for said units, an automatically scavenging controlled and supercharging air-overflow port provided between said air compressor unit and said high pressure power unit, a high pressure power piston controlled gas- and air-overflow port provided between said power units, an automatically controlled exhaust port provided for said low pressure power unit, the cubic displacement of said air compressor piston and of said low pressure power unit piston being each at least twice as great as the cubic displacement of said high pressure power unit piston, said air-overflow port and said gas- and air-overflow port and said exhaust port being open during a portion of the air compressor unit compression stroke, said air compressor unit scavenging and internally air-cooling said high pressure power unit during the said portion of said compression stroke at one atm., more or less air compression, over and above atmospheric pressure, at normal engine load, said air compressor subsequently supercharging and additionally internally air-cooling said high pressure power unit while said gas- and air-overflow port is closed, whereupon said air-overflow port is closed and said high pressure power unit piston continues to compress the air solely within said high pressure power unit, a fuel-inlet port being provided terminating into the compression chamber of the high pressure power unit.

6. A structure as in claim 5, wherein maximum compression within the high pressure power unit, at normal engine load, is 900 lbs., more or less, per sq. in., compression at low engine load being 600 lbs., more or less, per sq. in., said ports and the relative angular positions of said cranks being controlled and arranged, in such manner, that compression within said high pressure power unit increases and decreases automatically with increasing and decreasing engine load, said air-overflow port terminating tangentially into axially outer portions of the combustion chamber of said high pressure power unit, said gas- and air-overflow port emerging from within said high pressure power unit cylinder further axially inwardly, the arrangement being such, that during scavenging, pure and cool air flows from said air compressor unit through said air-overflow port into said axially outer combustion chamber portions, producing therein primarily powerful twirl and internal air-cooling, before the mixture of air and hot $CO_2$ gases flows spirally inwardly through said high pressure power unit cylinder, escaping through said open gas- and air-overflow port and successively escaping through said low pressure power unit and through said simultaneously open exhaust port, the shape of said axially outer combustion chamber portions, being such, that said twirl continues strongly throughout fuel inlet and combustion.

7. In a two-cycle, supercharged, compound, Diesel engine, an air compressor unit, a high pressure power unit and a low pressure power unit, each of said units having a separate cylinder and piston and connecting rod and crank, a common crankshaft for said units, the cubic displacement of said air compressor piston and of said low pressure power piston being each at least twice as great as the cubic displacement of said high pressure power piston, the engine having an automatically controlled scavenging and supercharging air-overflow port between said air compressor unit and said high pressure power unit and having a high pressure power piston controlled gas- and air-overflow port between said power units and having an automatically controlled exhaust port for said low pressure power unit, the said units being arranged in series and in open communication with each other by way of said overflow ports during a portion of the air compressor unit compression stroke, said air-overflow port terminating into the compression chamber of said high pressure power unit tangentially, the relative crank-angles, and the air pressure produced within said air compressor unit during said portion of said compression stroke, and the said ports, being so arranged and controlled, that scavenging- and cooling-air is flowing from said air compressor unit during said portion of said compression stroke into and spirally inwardly through the high pressure power unit producing therein powerful scavenging and internal air-cooling before escaping through said gas- and air-overflow port, whereupon said latter port, whereupon said latter port is closed, producing successively high supercharging of the high pressure power unit and additional air-twirl and internal air-cooling and compression, whereupon said air-overflow port is closed and said high pressure power piston produces higher compression solely within the high pressure power unit, the high pressure power unit compression chamber being of such shape, that it permits of substantially unobstructed continuous twirl of the highly compressed air and gases during fuel-injection and combustion, the engine having a separate port serving as a fuel inlet port and terminating into the compression chamber of the high pressure power unit.

8. A structure as in claim 7, wherein maximum air-compression within the high pressure power unit at normal engine load, is 900 lbs., per sq. in., more or less, said ports and said crank angles producing increasing and decreasing supercharging and compression with increasing and decreasing load, a speed controlled valve arranged in said gas- and air-overflow port producing approximately constant supercharging and compression at a given load, at variable engine speed.

9. A structure as in claim 7, wherein the air compressor unit piston and the low pressure power unit piston, each, are of the trunk piston type and wherein the high pressure power unit piston consists of an axially outer high pressure power piston portion sliding snugly within said high pressure power cylinder and of an axially inner cylindrical piston portion of larger diameter serving as crosshead and sliding snugly within a cylindrical crosshead guide arranged axially inwardly from and co-axially with said high pressure power cylinder, the high pressure power unit piston stroke being from two to three times as great as the diameter of said axially outer high pressure power piston portion.

10. In a two-cycle, supercharged, compound, Diesel engine, a cylinder air compressor unit, a cylinder high pressure power unit and a cylinder low pressure power unit, each of said units having a separate cylinder and piston, a common crankshaft for said units, an automatically valve controlled air-overflow port provided between said air compressor unit and said high pressure power unit for the purpose of powerfully scavenging and internally air-cooling and highly supercharging said latter power unit with substantially pure air from said air compressor unit, a high pressure power piston controlled gas- and air-overflow port provided between said power units, an automatically controlled exhaust port provided for said low pressure power unit, the cubic displacement of said air compressor piston and of said low pressure power piston, each, being at least twice as great as the cubic displacement of said high pressure power piston, the crank of said air compressor unit leading the crank of said high pressure power unit by more than 20 degrees and by less than 60 degrees, said high pressure power unit crank leading the crank of said low pressure power unit by more than 90 degrees and by less than 140 degrees.

11. In a two-cycle, supercharged, compound, Diesel engine, a cylinder air compressor unit, a cylinder high pressure power unit and a cylinder low pressure power unit, each of said units having a separate cylinder and piston and cylinder head, a common crankshaft for said units, an automatically controlled air-overflow port provided between said air compressor and said high pressure power unit for the purpose of scavenging and internally air-cooling and supercharging said latter power unit with pure air from said air compressor unit, a high pressure power piston controlled gas- and air-overflow port provided between said power units, an automatically controlled exhaust port provided for said low pressure power unit, means internally air-cooling and externally fluid-cooling said high pressure power cylinder and said high pressure power cylinder head, means externally fluid-cooling axially outer portions of said low pressure power cylinder, portions of said low pressure power cylinder and the said low pressure power cylinder head being jacketed, means admitting fluid into said jacket and maintaining thereby the external surfaces of said low pressure power cylinder portions and of said low pressure power cylinder head at temperatures of between 200 and 600 degrees F.

12. In a two-cycle, supercharged, compound, Diesel engine, a cylinder air compressor unit, a cylinder high pressure power unit and a cylinder low pressure power unit, each of said units having a separate cylinder and piston and cylinder head, a common crankshaft for said units, an automatically controlled air-overflow port being provided between said air compressor unit and said high pressure power unit for the purpose of scavenging and supercharging said high pressure power unit, a high pressure power piston controlled gas- and air-overflow port provided between said power units and an automatically controlled exhaust port provided for said low pressure power unit, means externally fluid cooling said high pressure power cylinder and said high pressure power cylinder head, means internally air cooling axially outer portions of said high pressure power cylinder and said high pressure power cylinder head, means maintaining the external surfaces of portions of said low pressure power cylinder head and of said low pressure power cylinder at temperatures between 200 and 600 degrees F., the engine having a separate port serving as a fuel-inlet port and terminating into the compression chamber of said high pressure power unit.

13. In a two-cycle, supercharged, compound, Diesel engine, a cylinder air compressor unit, a cylinder high pressure power unit and a cylinder low pressure power unit, each of said units having a separate cylinder and piston and cylinder head, a common crankshaft for said units, an automatically controlled air-overflow port being provided between said air compressor unit and said high pressure power unit for the purpose of scavenging and supercharging said high pressure power unit, a high pressure power piston controlled gas- and air-overflow port provided between said power units and an automatically controlled exhaust port provided for said low pressure power unit, means externally fluid cooling said high pressure power cylinder and said high pressure power cylinder head, means internally air-cooling axially outer portions of said high pressure power cylinder and said high pressure power cylinder head, means externally fluid cooling axially outer portions of said low pressure power cylinder and means surrounding said low pressure power cylinder head and the axially middle portions and axially inner portions of said low pressure power cylinder with hot fluid, the engine having a separate port serving as a fuel-inlet port and terminating into the compression chamber of said high pressure power unit.

14. In a two-cycle, supercharged, compound, Diesel engine, a cylinder air compressor unit, a cylinder high pressure power unit and a cylinder low pressure power unit, each of said units having a separate cylinder and piston and cylinder head, a common crankshaft for said units, an automatically controlled air-overflow port being provided between said air compressor unit and said high pressure power unit for the purpose of scavenging and supercharging said high pressure power unit, a high pressure power piston controlled gas- and air-overflow port provided between said power units and an automatically controlled exhaust port provided for said low pressure power unit, means being provided, externally fluid cooling portions of said air compressor unit cylinder and of said air compressor cylinder head, means internally air cooling axially outermost portions of said high pressure power cylinder and said high pressure power cylinder head, means externally fluid cooling said high pressure power cylinder and said high pressure power cylinder head, means externally fluid cooling axially o'.ermost portions of said low pressure power cylinder and means surrounding said low pressure power cylinder head and axially middle and axially inner portions of said low pressure power cylinder with hot fluid, the engine having a separate port serving as a fuel-inlet port and terminating into the compression chamber of said high pressure power unit.

15. In a two-cycle, supercharged, compound, Diesel engine, a cylinder air compressor unit, a cylinder high pressure power unit and a cylinder low pressure power unit, each of said units having a separate cylinder and piston, a common crankshaft for said units, an air-overflow port being provided between said air compressor unit and said high pressure power unit for the purpose of scavenging and supercharging and internally air-cooling said high pressure power unit, a check valve within said latter port arranged closely to said air compressor unit, a cylindrical automatically operated valve within the said port arranged closely to said high pressure power unit, said cylindrical valve being closed in advance of outer dead center air compressor piston position before said check valve closes automatically, preventing hammering produced otherwise as a result of sudden high back pressure caused by rapidly increasing pressure within said high pressure power unit, said cylindrical valve reopening in advance of the next following scavenging, a high pressure power piston controlled gas- and air-overflow port provided between the said power units and an automatically controlled exhaust port provided for said low pressure power unit, the engine having a separate port serving as a fuel-inlet port and terminating into the high pressure power unit compression chamber.

16. In a two-cycle, supercharged, compound, Diesel engine, a cylinder air compressor unit, a cylinder high pressure power unit and a cylinder low pressure power unit, each of said units having a separate cylinder and piston and crank, a common crankshaft for said units, an air-overflow port being provided between said air compressor unit and said high pressure power unit for the purpose of scavenging and supercharging said high pressure power unit, a check valve within said port adjacent to said air compressor unit, a cylindrical automatically operated valve arranged within said port adjacent to said high pressure power unit, said air compressor unit crank being less than 60 degrees in advance of said high pressure power unit crank, said cylindrical valve closing said air-overflow port in advance of outer dead center air compressor unit piston and crank position before said check valve closes automatically, for the purpose of preventing hammering of the check valve produced otherwise as a result of sudden high back pressure caused by rapidly increasing pressure within said high pressure power unit, said cylindrical valve reopening in advance of the next following scavenging, a high pressure power piston controlled gas- and air-overflow port provided between the said power units and an automatically controlled exhaust port provided for said low pressure power unit, the engine having a separate port serving as a fuel-inlet port and terminating into the compression chamber of the high pressure power unit.

17. In a two-cycle, supercharged, compound, Diesel engine, a cylinder air compressor unit, a cylinder high pressure power unit and a cylinder low pressure power unit, each of said units having a separate cylinder and piston and connecting rod and crank, a common crankshaft for said units, the crank for said air compressor unit travelling in advance of the crank for said high pressure power unit and said latter crank travelling in advance of the crank for said low pressure power unit, an air-overflow port being provided between said air compressor unit and said high pressure power unit for the purpose of scavenging and supercharging said high pressure power unit, a check valve within said port arranged adjacent to said air compressor unit, a cylindrical automatically operated valve within said port arranged adjacent to said high pressure power unit, said cylindrical valve closing said port in advance of outer dead center air compressor unit piston position before said check valve closes automatically, preventing hammering produced otherwise as a result of sudden high back pressure caused by rapidly increasing pressure within said high pressure power unit, said cylindrical valve reopening in advance of the next following scavenging, a high pressure power unit piston controlled gas- and air-overflow port being provided between the said power units and an automatically controlled exhaust port provided for said low pressure power unit, the cubic displacement of said air compressor unit piston and of said low pressure power unit piston being each at least twice as great as the cubic displacement of said high pressure power unit piston, the engine having a separate port serving as a fuel-inlet port and terminating into the compression chamber of said high pressure power unit.

18. A structure as in claim 17, wherein said cylindrical valve reopens before the pressure within said air compressor unit rises above the pressure within said high pressure power unit permitting air-overflow and preventing partial vacuum within said power cylinders at low engine load.

19. In a two-cycle, supercharged, compound, Diesel engine, a cylinder air compressor unit, a cylinder high pressure power unit and a cylinder low pressure power unit, each of said units having a separate cylinder and piston, a common crankshaft for said units, an automatically valve controlled air-overflow port being provided between said air compressor unit and said high pressure power unit for the purpose of scavenging and supercharging and internally air cooling said high pressure power unit, a high pressure power piston controlled gas and air-overflow port provided between said power units, an automatically operated speed-controlled cylindrical valve arranged within said gas- and air-overflow port, said cylindrical valve closing said gas- and air-overflow port during scavenging at below normal engine speed at least partly in advance of the high pressure power piston, said cylindrical valve opening again before said high pressure power piston reopens said gas- and air-overflow port during the next following power stroke, a low pressure power piston controlled exhaust port and an additional valve controlled exhaust port provided for said low pressure power unit, the engine having a separate port serving as a fuel-inlet port and terminating into the high pressure power unit compression chamber.

20. In a two-cycle, supercharged, compound, Diesel engine, a cylinder air compressor unit, a cylinder high pressure power unit and a cylinder low pressure power unit, each of said units having a separate cylinder and piston, a common crankshaft for said units, an automatically controlled air-overflow port being provided between said air compressor unit and said high pressure power unit for the purpose of scavenging and supercharging said high pressure power unit, a high pressure power piston controlled gas- and air-overflow port provided between said power units, a speed-controlled valve being arranged within said gas- and air-overflow port, said speed-controlled valve closing said gas- and air-overflow port during scavenging at least partly in advance of said high pressure power piston at low engine speed, said valve opening again before said high pressure power piston reopens said gas- and air-overflow port during the next following power stroke, said low pressure power unit having an automatically controlled exhaust port, the engine having a separate port serving as a fuel inlet port and terminating into the compression chamber of said high pressure power unit.

21. In a two-cycle, supercharged, compound, Diesel engine, a cylinder air compressor unit, a cylinder high pressure power unit and a cylinder low pressure power unit, each of said units having a separate cylinder and piston, a common crankshaft for said units, an automatically controlled air-overflow port being provided between said air compressor unit and said high pressure power unit for the purpose of scavenging and supercharging said high pressure power unit, a high pressure power piston controlled gas- and air-overflow port provided between said power units, a speed-controlled device being arranged within said gas- and air-overflow port, said device closing said gas- and air-overflow port during scavenging, at low engine speed, at least partly in advance of the high pressure power unit piston, said device opening again during the next following power stroke, before said high pressure power piston reopens said gas- and air-overflow port, the engine having an automatically controlled low pressure power unit exhaust port, the cubic displacement of said air compressor unit piston and of said low pressure power unit piston being each at least twice as great as the cubic displacement of said high pressure power unit piston, the engine having a separate port serving as a fuel-inlet port and terminating into the compression chamber of said high pressure power unit.

22. In a two-cycle, supercharged, compound, Diesel engine, a cylinder air compressor unit, a cylinder high pressure power unit and a cylinder low pressure power unit, each of said units having a separate cylinder and piston and cylinder head, a common crankshaft for said units, an automatically controlled air-overflow port provided between said air compressor unit and said high pressure power unit for the purpose of scavenging and internally air-cooling and supercharging said latter power unit with substantially pure air from said air compressor unit, a high pressure power piston controlled gas- and air-overflow port provided between said power units, an automatically controlled exhaust port provided for said low pressure power unit, an internally cylindrical guide connected with said high pressure power cylinder, a cylindrical fuel spray valve casing or the like arranged slidably within said guide axially outwardly from and co-axially with said high pressure power cylinder, said cylinder head being gripped solely between said spray valve casing and said high pressure power cylinder, means pressing said spray valve casing or the like uniformly tight on said cylinder head and thereby simultaneously pressing said cylinder head uniformly tight on said high pressure power cylinder, means internally air cooling said high pressure power cylinder and said high pressure power cylinder head, means externally fluid cooling said high pressure power cylinder and said high pressure cylinder head, means externally fluid cooling axially outer portions of said low pressure power cylinder and means maintaing the external surface of axially middle and axially inner portions of said latter cylinder at temperatures between 200 and 600 degrees F.

23. In a two-cycle, supercharged, compound, Diesel engine, an air compressor unit, a high pressure power unit and a low pressure power unit, each of said units having a separate cylinder and piston and connecting rod and crank, a common crankshaft for said units, the cubic displacement of said air compressor piston and of said low pressure power piston, being each at least twice as great as the cubic displacement of said high pressure power piston, the engine having an automatically controlled scavenging and supercharging air-overflow port between said air compressor unit and said high pressure power unit and having a high pressure power piston controlled gas- and air-overflow port between said power units and having a low pressure power piston controlled exhaust port, said air compressor unit having a cylinder head containing an automatically valve controlled air-inlet port, said air compressor unit having an additional, separate, valve controlled starting-air inlet port terminating therein, said air compressor unit having an air compressor piston controlled starting-air outlet port emerging from within axially inner portions of said air compressor cylinder, said engine having a low pressure power cylinder head containing a second automatically controlled low pressure power unit exhaust port, said low pressure power unit having also a second automatically controlled starting-air inlet port terminating therein, said low pressure power piston controlled exhaust port serving simultaneously as exhaust outlet and as starting-air outlet for said low pressure power unit, the said units being arranged in series and in open communication with each other by way of said overflow ports during a portion of the air compressor unit compression stroke while said power piston controlled exhaust port is simultaneously open, the relative crank-angles of the engine and the air pressure produced within said air compressor unit during said portion of said compression stroke, being such, and the said ports being so arranged and controlled, that scavenging- and cooling-air is flowing from said air compressor unit successively through said high pressure power unit and through said low pressure power unit and through said low pressure power piston controlled exhaust port, at sufficiently high air pressure over and above atmospheric pressure within said air compressor unit, producing powerful scavenging and internal air-cooling of the high pressure power unit, whereupon the said gas- and air-overflow port is closed, producing successively additional internal air-cooling and high supercharging and compression within the high pressure power unit, whereupon said air-overflow port is closed and said high pressure power piston produces higher compression solely within said high pressure power unit, the engine having a separate port serving as a fuel-inlet port terminating into the compression chamber of the high pressure power unit, the purpose of the arrangement being, to operate the engine on starting-air admitted directly into the air compressor unit and directly into the low pressure power unit, while fuel simultaneously flow through said fuel-inlet port directly into the high pressure power unit, permitting instant starting and simultaneous operation on starting air and on fuel, providing a large excess of power during short periods of simultaneous operation on fuel and on starting-air.

FRANCIS MARBURG.

CERTIFICATE OF CORRECTION.

Patent No. 2,309,968. February 2, 1943.

FRANCIS MARBURG.

It is hereby certified that error appears in the printed specification of the above numbered patent requiring correction as follows: Page 13, first column, line 58, for "scavenging controlled" read --controlled scavenging--; and that the said Letters Patent should be read with this correction therein that the same may conform to the record of the case in the Patent Office.

Signed and sealed this 25th day of May, A. D. 1943.

(Seal)

Henry Van Arsdale,
Acting Commissioner of Patents.